(12) United States Patent
Imai et al.

(10) Patent No.: US 9,337,945 B2
(45) Date of Patent: May 10, 2016

(54) RECEIVING APPARATUS AND RECEIVING METHOD FOR RECEIVING BROADCASTING WAVES OF DIFFERENT FREQUENCY BANDS

(75) Inventors: Tadashi Imai, Chiba (JP); Takayuki Kaida, Tokyo (JP); Satoru Kawakami, Kanagawa (JP); Hitoshi Masumura, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 67 days.

(21) Appl. No.: 14/007,248

(22) PCT Filed: Mar. 23, 2012

(86) PCT No.: PCT/JP2012/057423
§ 371 (c)(1),
(2), (4) Date: Sep. 24, 2013

(87) PCT Pub. No.: WO2012/133133
PCT Pub. Date: Oct. 4, 2012

(65) Prior Publication Data
US 2014/0024326 A1    Jan. 23, 2014

(30) Foreign Application Priority Data

Mar. 31, 2011 (JP) ................................. 2011-081017
Jun. 20, 2011 (JP) ................................. 2011-136397
Mar. 1, 2012 (JP) ................................. 2012-045657

(51) Int. Cl.
*H04B 1/16* (2006.01)
*H04H 20/44* (2008.01)
(Continued)

(52) U.S. Cl.
CPC ............... *H04H 40/18* (2013.01); *H04H 20/26* (2013.01); *H04H 40/90* (2013.01); *H04N 5/455* (2013.01); *H04N 5/46* (2013.01); *H04N 21/4263* (2013.01);
(Continued)

(58) Field of Classification Search
USPC .............. 455/132, 133, 136, 140, 141, 179.1, 455/180.2, 180.3, 188.1, 188.2, 196.1, 455/199.1
See application file for complete search history.

(56) References Cited

U.S. PATENT DOCUMENTS 5,014,349 A * 5/1991 Kubo et al. ................. 455/189.1
6,816,704 B1 * 11/2004 Fukuda ............................ 455/7
(Continued)

FOREIGN PATENT DOCUMENTS

DE 102007042146 12/2008
EP 1505731 2/2005
(Continued)

OTHER PUBLICATIONS

Fractional/Integer-N PLL Basics, Technical Brief SWRA029I, Texas Instruments, Wireless Communication Business Unit, Aug. 1999.
(Continued)

*Primary Examiner* — Blane J Jackson
(74) *Attorney, Agent, or Firm* — Hazuki International, LLC

(57) ABSTRACT

A first high frequency processing unit detects a first broadcasting wave transmitted using a first frequency band, and extracts a first high frequency signal. Further, a second high frequency processing unit detects a second broadcasting wave transmitted using a second frequency band different from the first frequency band, and extracts a second high frequency signal. Furthermore, at least one local oscillator generates a local oscillation signal used in the first high frequency processing unit and the second high frequency processing unit.

15 Claims, 10 Drawing Sheets

(51) Int. Cl.
  *H04H 40/18*   (2008.01)
  *H04N 5/455*   (2006.01)
  *H04N 5/46*    (2006.01)
  *H04N 21/462*  (2011.01)
  *H04N 21/426*  (2011.01)
  *H04N 21/438*  (2011.01)
  *H04N 21/61*   (2011.01)
  *H04H 20/26*   (2008.01)
  *H04H 40/90*   (2008.01)

(52) U.S. Cl.
  CPC ....... *H04N 21/4382* (2013.01); *H04N 21/4622* (2013.01); *H04N 21/6112* (2013.01); *H04N 21/6143* (2013.01)

(56) References Cited

U.S. PATENT DOCUMENTS 7,181,181 B2 *  2/2007  Lee et al. ............... 455/260
7,421,040 B2 *  9/2008  Cowley ................... 375/316
7,831,198 B2 * 11/2010  Kishida et al. .......... 455/3.02
2004/0002304 A1  1/2004  Miyahara
2006/0083335 A1  4/2006  Seendripu et al.

FOREIGN PATENT DOCUMENTS

| EP | 1 505 731 A1 * | 6/2005 | ............ H03J 5/24 |
| EP | 1657919 | 5/2006 | |
| JP | 2000-295539 | 10/2000 | |
| JP | 2002-118795 | 4/2002 | |
| WO | 2009/101811 | 8/2009 | |
| WO | 2009/143082 | 11/2009 | |
| WO | 2010/121261 | 10/2010 | |

OTHER PUBLICATIONS

European Search Report issued Sep. 26, 2014, for corresponding European Appln. No. 12765838.3.

* cited by examiner

FIG. 3

| | SATELLITE BROADCASTING | TERRESTRIAL DIGITAL BROADCASTING/ CABLE TELEVISION BROADCASTING |
|---|---|---|
| INPUT FREQUENCY TO RECEIVING APPARATUS | 950MHz TO 2150MHz | 44MHz TO 870MHz |
| OCCUPIED BANDWIDTH OF MODULATED WAVE | 20MHz TO 40MHz | 6, 7, 8MHz (JAPANESE CABLE TELEVISION IS ONLY 6MHz) |
| INPUT SIGNAL LEVEL | −28dBm TO −61dBm | −20dBm TO −75dBm |
| MINIMUM VCO (PLL) STEP FREQUENCY | ABOUT 500kHz TO 1MHz | 125kHz TO 166.7kHz |
| VCO (PLL) PHASE NOISE CHARACTERISTIC | PERFORMANCE OF 10kHz OR MORE IS IMPORTANT | PERFORMANCE OF 1kHz OR LESS IS ALSO IMPORTANT |
| FREQUENCY DIVISION RATIO (WHEN OSCILLATION FREQUENCY OF VCO IS 2200 TO 4400MHz) | ABOUT 2 TO 4 | AVAILABLE IN WHOLE RANGE OF 2 TO 64 |

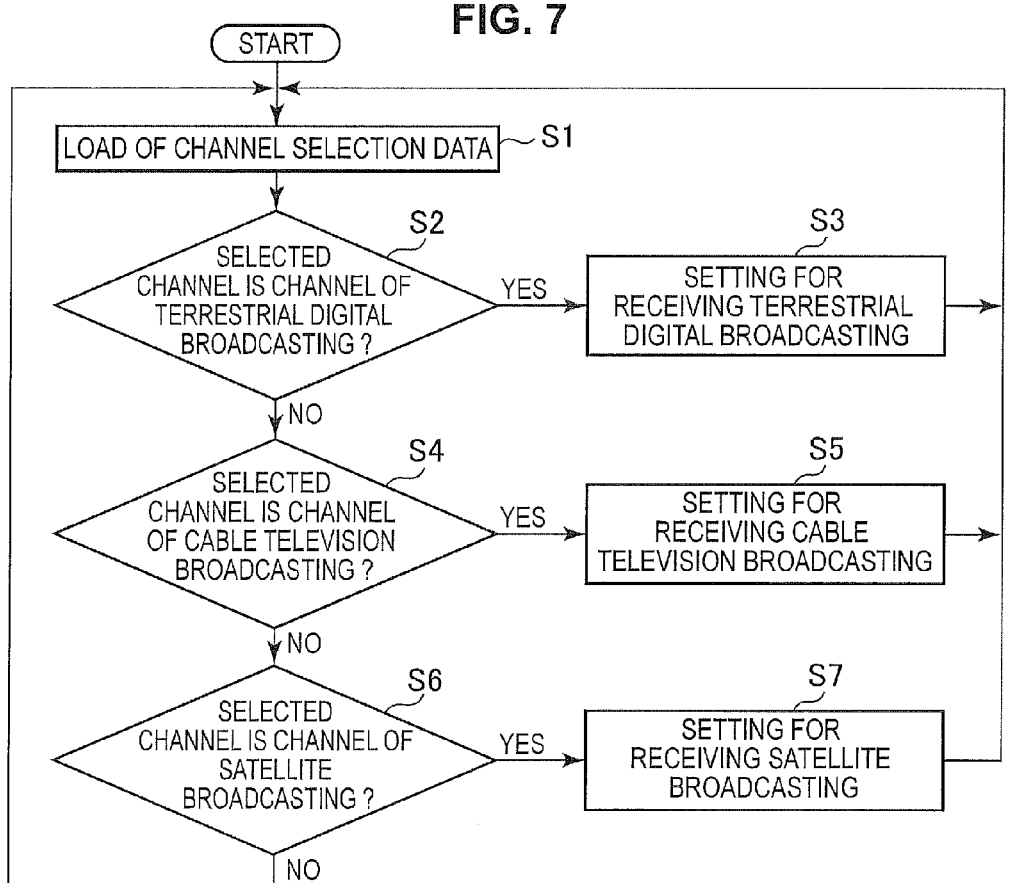

|  | TERRESTRIAL DIGITAL BROADCASTING | CABLE TELEVISION BROADCASTING | SATELLITE BROADCASTING |
|---|---|---|---|
| CONNECTION POINT OF SWITCH | AGC AMPLIFIER 302 | AGC AMPLIFIER 302 | AGC AMPLIFIER 301 |
| OUTPUT FREQUENCY OF VCO | 2200MHz TO 4400MHz | 2200MHz TO 4400MHz | 2200MHz TO 4400MHz |
| FREQUENCY DIVISION RATIO OF FREQUENCY DIVIDER | 2 TO 64 | 2 TO 64 | 2 TO 4 |
| CUT-OFF FREQUENCY OF VARIABLE LPF | 3 TO 4MHz | 3 TO 4MHz | 5 TO 36MHz |
| CORRESPONDING BROADCASTING STANDARD OF DEMODULATOR (DEMODULATION SCHEME) | ISDB-T (OFDM, 8VSB, OR THE LIKE) | (64QAM, 128QAM, 256QAM, OR THE LIKE) | ISDB-S (QPSK, 8PSK, OR THE LIKE) |

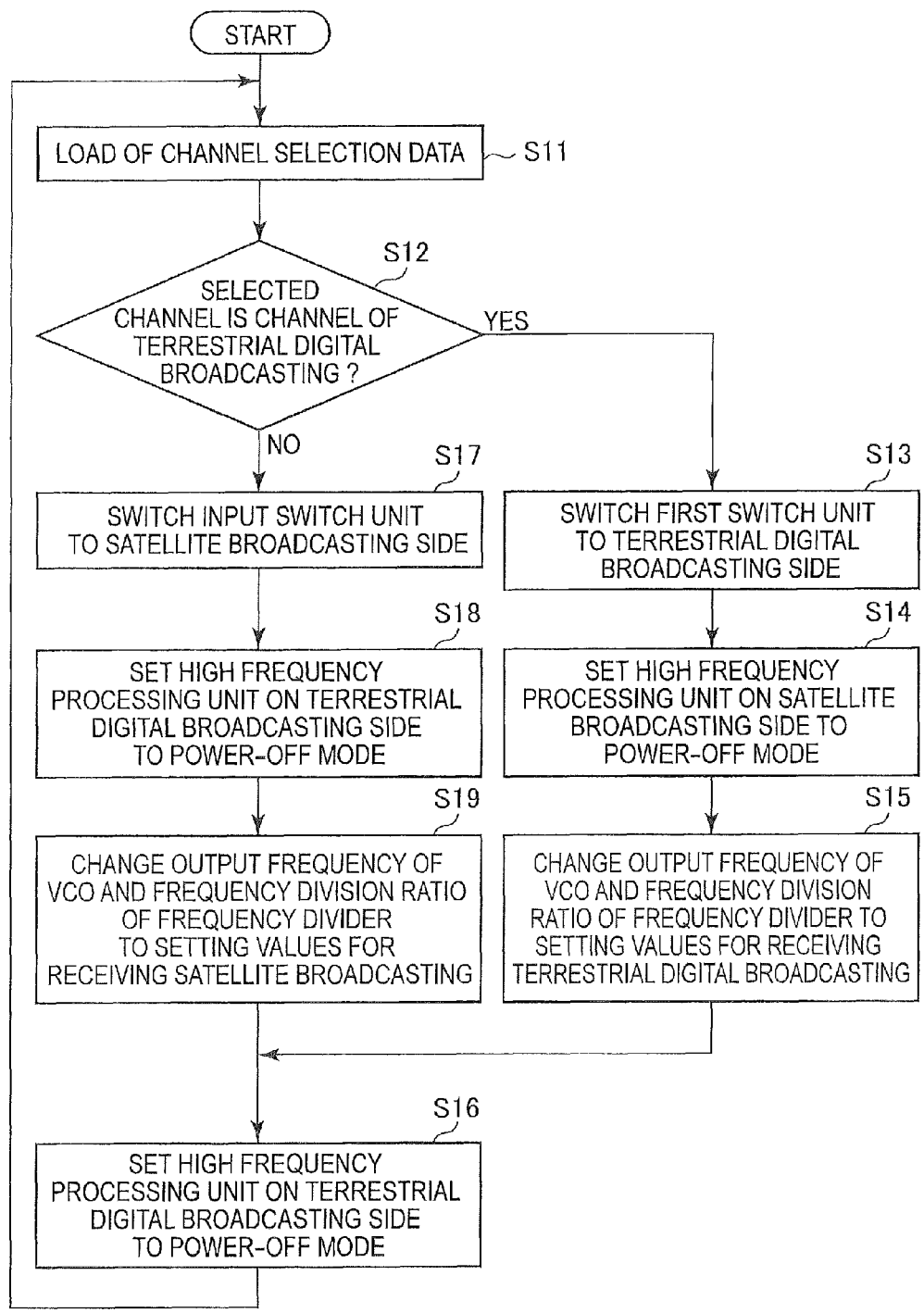

RECEIVING APPARATUS AND RECEIVING METHOD FOR RECEIVING BROADCASTING WAVES OF DIFFERENT FREQUENCY BANDS

CROSS REFERENCES TO RELATED APPLICATIONS

The present application is a national stage of International Application No. PCT/JP2012/057423 filed on Mar. 23, 2012 and claims priority to Japanese Patent Application No. JP2011-081017 filed on Mar. 31, 2011, JP2011-1136397 filed on Jun. 20, 2011, and JP2012-045657 filed on Mar. 1, 2012, the disclosure of which is incorporated herein by reference.

BACKGROUND

The present disclosure relates to a reception apparatus that receives a broadcasting wave and a reception method used in the receiving apparatus, and more particularly, to technology for receiving a plurality of broadcasting waves of different frequency bands.

Recently, types of broadcasting schemes (standards) such as terrestrial digital television broadcasting, satellite broadcasting, or the like are diversifying. Also, types of broadcasts (number of channels) handled by one broadcasting scheme are increasing, and thus a frequency band used for transmission of a broadcasting wave is getting wider. Accordingly, a demand to receive various broadcasting schemes or various types of broadcasts using one receiving apparatus is increasing. However, for example, satellite broadcasting and terrestrial digital television broadcasting use very different frequency bands for transmission of broadcasting waves. For this reason, tuners are separately installed for respective broadcasts of such different frequency bands, respectively. This is because, in this way, it is possible to easily implement settings appropriate for receiving respective broadcasting waves, and improve a reception characteristic.

However, when a plurality of tuners are installed, the problems such as an increase in production cost, an increase in device size caused by an increase in circuit mounting area, and an increase in power consumption occur. As a technique of solving these problems, for example, patent literature 1 discloses a technique capable of achieving communization of circuits by configuring tuner units configured to receive respective broadcasts as one module in a receiving apparatus that receives a broadcasting wave of terrestrial digital broadcasting and a broadcasting wave of BS digital broadcasting.

CITATION LIST

Patent Literature

Patent Literature 1: JP 2002-135668A

SUMMARY

Technical Problem

However, when respective tuner units configured to receive respective broadcasts (in particular, high frequency processing units referred to as so-called RF front ends) are simply integrated in one module, a size of a receiving circuit increases, and thus the module becomes large. Also, as local oscillators of different oscillation frequencies are mounted on the same module, spurious generated from the respective local oscillators influence each other, and the problem of deterioration of a reception characteristic occurs.

It is desirable to hold down a circuit size as small as possible and also keep a satisfactory reception characteristic in a receiving apparatus that receives a plurality of broadcasting waves of different frequency bands.

Solution to Problem

According to a first aspect of the present disclosure, a receiving apparatus includes a first high frequency processing unit, a second high frequency processing unit, and at least one local oscillator, and performing respective functions and processes as follows. The first high frequency processing unit detects a first broadcasting wave transmitted using a first frequency band, and extracts a first high frequency signal. The second high frequency processing unit detects a second broadcasting wave transmitted using a second frequency band different from the first frequency band, and extracts a second high frequency signal. The at least one local oscillator generates a local oscillation signal used in the first high frequency processing unit and the second high frequency processing unit.

According to a second aspect of the present disclosure, a receiving method is performed in the following sequence. First, a first high frequency processing unit detects a first broadcasting wave transmitted using a first frequency band, and extracts a first high frequency signal. Subsequently, a second high frequency processing unit detects a second broadcasting wave transmitted using a second frequency band different from the first frequency band, and extracts a second high frequency signal. At least one local oscillator generates a local oscillation signal used in the first high frequency processing unit and the second high frequency processing unit.

By configuring a receiving apparatus and performing a process as described above, it is possible to detect a broadcasting wave using the local oscillation signal oscillated by the at least one local oscillator even when a plurality of high frequency processing units configured to receive a plurality of broadcasting waves of different frequency bands are installed.

Advantageous Effects of Invention

According to a receiving apparatus and a receiving method of the present disclosure, even though a plurality of broadcasting waves of different frequency bands are received, when at least one local oscillator is installed therein, a satisfactory result may be obtained. Accordingly, a circuit size of the receiving apparatus is held down as small as possible, and received signals of a plurality of broadcasting waves of different frequency bands are extracted without deteriorating a reception characteristic of the received signals.

Additional features and advantages are described herein, and will be apparent from the following Detailed Description and the figures.

BRIEF DESCRIPTION OF FIGURES

FIG. 3 is an explanatory diagram showing an example of requirements necessary for a receiving apparatus.

FIG. 7 is a flowchart showing an example of control by a host CPU according to the first embodiment of the present disclosure.

FIG. 8 is an explanatory diagram showing an example of a setting made by a host CPU according to the first embodiment of the present disclosure.

FIG. 11 is a flowchart showing an example of a receiving process of the receiving apparatus according to the second embodiment of the present disclosure.

DETAILED DESCRIPTION

First, technology to be the premise of the present disclosure will be described with reference to FIG. 1 to FIG. 3, and then, a configuration example of a receiving apparatus according to an embodiment of the present disclosure will be described in the following sequence. However, the present disclosure is not limited to an example stated below.

1. Example of First Embodiment (example of a configuration for receiving a plurality of broadcasting waves of different broadcasting schemes using a single detection scheme)
  1-1. Description of Technology to be Premise
  1-2. Configuration Example According to First Embodiment (example configured with one demodulator)
  1-3. Various Modified Examples
2. Configuration Example According to Second Embodiment (example of a configuration in which a plurality of high frequency processing units handling a plurality of broadcasting waves of different broadcasting schemes share one local oscillator)

[1. Example of First Embodiment]
<1-1. Technology to be Premise of this Embodiment>

Currently, detection (demodulation) of a broadcasting wave of satellite broadcasting is performed using a scheme referred to as a "direct conversion scheme." In the direct conversion scheme, a baseband signal is directly extracted from a received broadcasting wave. Detection of terrestrial digital broadcasting or cable television broadcasting is performed using a scheme referred to as a "super heterodyne scheme." In the super heterodyne scheme, a frequency of a received radio wave is converted into a specific intermediate frequency (IF) and then detected.

Figure 1:
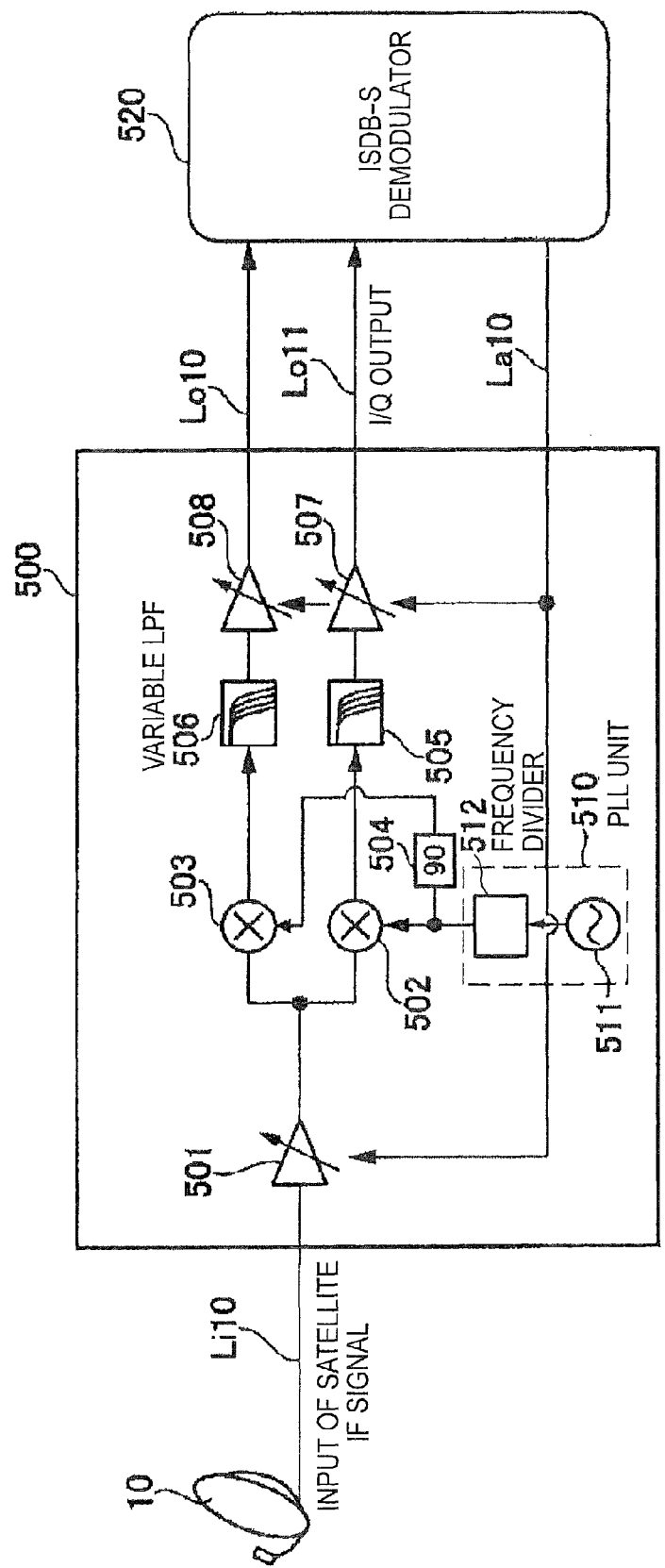
FIG. 1 is a block diagram showing a configuration example of a receiving apparatus that performs wave detection using a direct conversion scheme.

FIG. 1 shows a configuration example of a receiving apparatus 5 when wave detection is performed using the direct conversion scheme. The receiving apparatus 5 has a parabola antenna 10, a high frequency processing unit 500, and an Integrated Services Digital Broadcasting-Satellite (ISDB-S) demodulator 520. The high frequency processing unit 500 has an automatic gain control (AGC) amplifier 501 serving as a low noise amplifier, an I/Q mixer 502, an I/Q mixer 503, a PLL unit 510 serving as a local oscillator, a phase shifter 504, a variable Low Pass Filter (LPF) 505, a variable LPF 506, a baseband amplifier 507, and a baseband amplifier 508.

The parabola antenna 10 converts a received broadcasting wave of satellite broadcasting into a satellite IF signal, and inputs the obtained satellite IF signal to the AGC amplifier 501 in the high frequency processing unit 500 through a signal line Li10. The AGC amplifier 501 adjusts the gain of the satellite IF signal input from the signal line Li10 based on an AGC control signal input from the ISDB-S demodulator 520 through a control line La10 as feedback, and outputs the satellite IF signal whose gain has been adjusted. The satellite IF signal whose gain has been adjusted by the AGC amplifier 501 is input to the I/Q mixer 502 and the I/Q mixer 503. The I/Q mixer 502 mixes the satellite IF signal input from the AGC amplifier 501 and a local signal output from the PLL unit 510, and thereby extracts a baseband signal of I phase. The I/Q mixer 503 mixes the satellite IF signal input from the AGC amplifier 501 and the local signal that is output from the PLL unit 510 and whose phase is shifted by 90° by the phase shifter 504, and thereby extracts a baseband signal of Q phase.

The PLL unit 510 includes a voltage controlled oscillator (VCO) 511 and a frequency divider 512. The VCO 511 controls a frequency of an oscillating signal according to a level of a control voltage applied through a loop filter that is not shown in the drawings. In the example of FIG. 1, the VCO 511 oscillates a frequency of a range of 2200 MHz to 4400 MHz. The frequency divider 512 divides the frequency oscillated by the VCO 511 by 2 to 4, and inputs the divided frequencies to a phase comparator that is not shown in the drawings. From the phase comparator, an error signal according to a phase difference between an input reference signal and the oscillation signal from the VCO 511 is output. Then, the error signal becomes the direct current control voltage by passing through the loop filter, and is applied to the VCO 511. With this configuration, the oscillation signal (local signal) of a range of 550 MHz to 2200 MHz is generated from the PLL unit 510. In other words, a local signal of the same frequency as that of a broadcasting wave of satellite broadcasting (950 MHz to 2150 MHz: in the case of BS/CS broadcasting) is output from the PLL unit 510.

As described above, the local signal output from the PLL unit 510 is mixed with the satellite IF signal by the I/Q mixer 502 and the I/Q mixer 503 and converted into the baseband signals of I phase and Q phase. The baseband signals of I phase and Q phase are input to the variable LPF 505 and the variable LPF 506. The variable LPF 505 limits a frequency of the baseband signal of Q phase to a predetermined band and outputs the frequency of the baseband signal of Q phase, and the variable LPF 506 limits a frequency of the baseband signal of I phase to a predetermined band and outputs the frequency of the baseband signal of I phase. Cut-off frequencies of the variable LPFs 505 and 506 are allowed to be switched in a range of 5 MHz to 36 MHz. The aforementioned setting value of the cut-off frequencies is an example, and in practice, varies according to an occupied bandwidth of a broadcasting wave input to the receiving apparatus 5.

The baseband signal of I phase and the baseband signal of Q phase whose bands are limited by the variable LPF 505 and the variable LPF 506 are output to the baseband amplifier 507 and the baseband amplifier 508, respectively. The baseband amplifier 507 and the baseband amplifier 508 adjust levels of the input baseband signals of I phase/Q phase such that the signal levels of the baseband signals of I phase/Q phase become constant levels, and output the baseband signals of I phase/Q phase whose signal levels have been adjusted to the ISDB-S demodulator 520 via a signal line Lo10 and a signal line Lo11. Adjustment of the levels of the input baseband signals of I phase/Q phase is performed based on the AGC control signal input from the ISDB-S demodulator 520 via the control line La10.

The ISDB-S demodulator 520 demodulates the input baseband signals using a demodulation scheme according to a modulation scheme adopted by ISDB-S that is broadcasting standards of satellite broadcasting. As the modulation scheme adopted by ISDB-S, there is a scheme such as a quadrature phase shift keying (QPSK) scheme, an 8 phase shift keying (8PSK) scheme, or the like. Also, the ISDB-S demodulator 520 generates the AGC control signal, and supplies the generated AGC control signal to the AGC amplifier 501, the baseband amplifier 507, and the baseband amplifier 508 through the control line La10.

Figure 2:
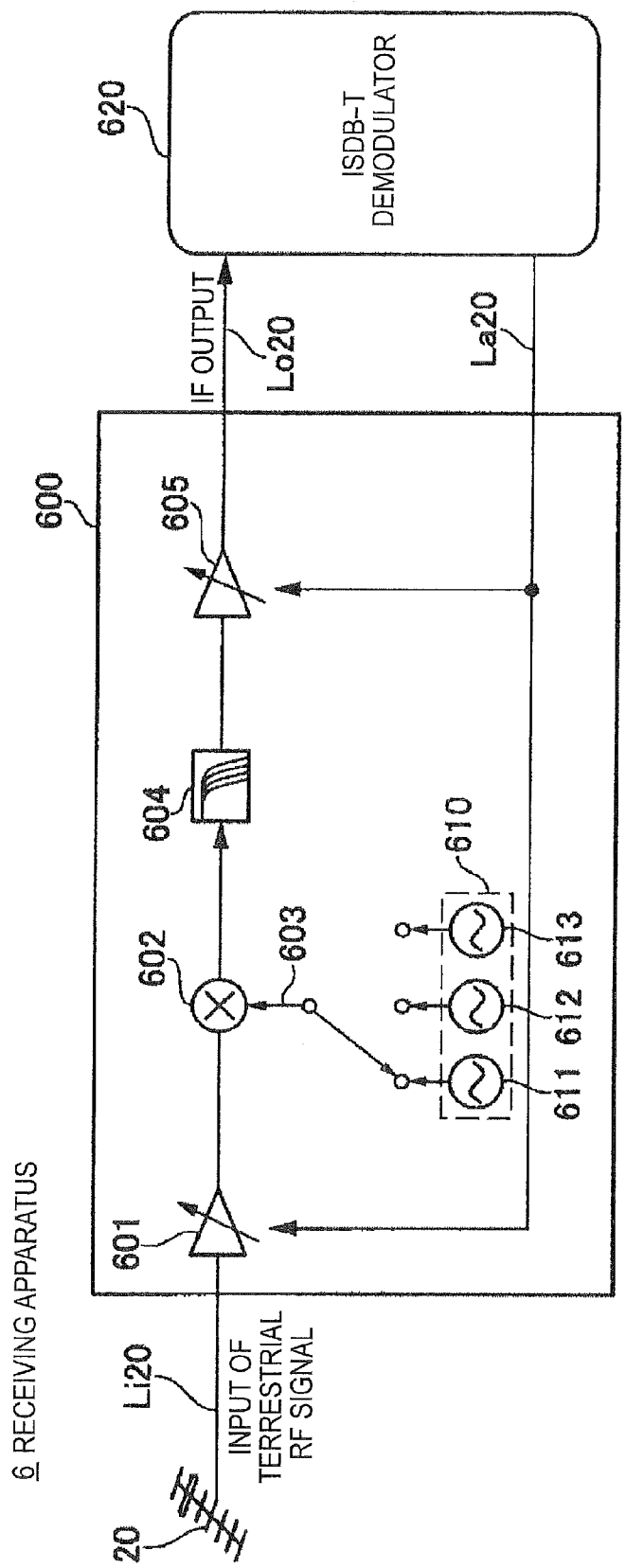
FIG. 2 is a block diagram showing a configuration example of a receiving apparatus that performs wave detection using a super heterodyne scheme.

FIG. 2 is a block diagram showing a configuration example of a receiving apparatus 6 that performs wave detection of terrestrial digital broadcasting using the super heterodyne scheme. The receiving apparatus 6 has a UHF antenna 20, a high frequency processing unit 600, and an Integrated Services Digital Broadcasting-Terrestrial (ISDB-T) demodulator 620. The high frequency processing unit 600 has an AGC amplifier 601, a mixer 602, a local oscillation unit 610, a switch 603, a Band Pass Filter (BPF) 604, and an IF amplifier 605.

A broadcasting wave of terrestrial digital broadcasting received by the UHF antenna 20 (will be referred to as a "terrestrial RF signal" below) is input to the AGC amplifier 601 in the high frequency processing unit 600 via a signal line Li20. Based on an AGC control signal input from the ISDB-T demodulator 620 through a signal line La20, the AGC amplifier 601 amplifies the terrestrial RF signal (radio frequency: high frequency signal) input from the signal line Li20 and outputs the amplified terrestrial RF signal. The terrestrial RF signal amplified by the AGC amplifier 601 is input to the mixer 602. The mixer 602 converts the terrestrial RF signal input from the AGC amplifier 601 into an intermediate frequency (IF) signal using an oscillation signal output from the local oscillation unit 610. The local oscillation unit 610 includes a VCO 611, a VCO 612, and a VCO 613. The VCO 611, the VCO 612, and the VCO 613 each generate oscillation signals having a bandwidth of about 300 MHz, and have different ranges of oscillating frequencies. In the example shown in FIG. 2, the local oscillation unit 610 is configured to generate oscillation signals of a range of 80 MHz to 910 MHz by the VCO 611, the VCO 612, and the VCO 613.

The switch 603 selects one of the oscillation signals output from the VCO 611, the VCO 612, and the VCO 613 and supplies the selected oscillation signal to the mixer 602. The IF signal obtained at the mixer 602 is input to the BPF 604. The BPF 604 is configured as a fixed BPF or a variable BPF. When the BPF 604 is configured as a fixed BPF, the BPF 604 is configured with three different BPFs whose pass frequencies have been set to 6 MHz, 7 MHz, and 8 MHz, and when the BPF 604 is configured as a variable BPF, the BPF 604 is configured with a BPF whose pass frequency is switched in a range of 6 MHz to 8 MHz. The IF signal whose band is limited to one band of 6 MHz to 8 MHz by the BPF 604 is input to the IF amplifier 605. Based on the AGC control signal input from the ISDB-T demodulator 620 through the signal line La20, the IF amplifier 605 adjusts a level of the IF signal to a constant level, and outputs the IF signal having been subjected to level adjustment to the ISDB-T demodulator 620.

The ISDB-T demodulator 620 demodulates the RF signal output from the high frequency processing unit 600 using a demodulation scheme according to a modulation scheme adopted by ISDB-T that is broadcasting standards of terrestrial digital broadcasting. The modulation scheme adopted by an ISDB-T scheme is an Orthogonal Frequency Division Multiplexing (OFDM) scheme, an 8-level vestigial sideband modulation (8VSB) scheme, or the like. An OFDM subcarrier modulation scheme is a Quadriphase PSK (QPSK) scheme, a 16 quadrature amplitude modulation (16QAM) scheme, a 64QAM scheme, or the like. Also, the ISDB-T demodulator 620 generates the AGC control signal, and supplies the generated AGC control signal to the AGC amplifier 601 and the IF amplifier 605 through the signal line La20.

Next, environments in which configurations of the receiving apparatus 5 configured to receive satellite broadcasting and the receiving apparatus 6 configured to receive terrestrial digital broadcasting become those shown in FIG. 1 and FIG. 2 will be described with reference to a table of FIG. 3. The table of FIG. 3 shows difference between requirements necessary for respective receiving apparatuses. The requirements include "Input frequency to receiving apparatus," "Occupied bandwidth of modulated wave." "Input signal level," "Minimum VCO (PLL) step frequency," "VCO (PLL) phase noise," and "Frequency division ratio." With regard to each item, comparison is made between the receiving apparatus 5 configured to receive satellite broadcasting and the receiving apparatus 6 configured to receive terrestrial digital broadcasting. Since specifications necessary for a receiving apparatus of cable television broadcasting is substantially the same as those necessary for a receiving apparatus of terrestrial digital broadcasting, the two broadcasting schemes of terrestrial digital broadcasting and cable television broadcasting are put in the same category.

An input frequency to the receiving apparatus 5 configured to receive satellite broadcasting is 950 MHz to 2150 MHz, and an input frequency to the receiving apparatus 6 of terrestrial digital broadcasting or cable television broadcasting is 44 MHz to 870 MHz. In other words, it is possible to know that a frequency band used to transmit a broadcasting wave of satellite broadcasting is higher than a frequency band used to transmit a broadcasting wave of terrestrial digital broadcasting or cable television broadcasting. An occupied bandwidth of a modulated wave is 20 MHz to 40 MHz in satellite broadcasting, and 6 MHz, 7 MHz, and 8 MHz in terrestrial digital broadcasting or cable television broadcasting (however, only 6 MHz is used in Japanese cable television broadcasting). In other words, it is possible to know that an occupied bandwidth of a modulated wave of satellite broadcasting is wide, and an occupied bandwidth of a modulated wave of terrestrial digital broadcasting or cable television broadcasting is very small.

For this reason, a minimum step frequency of a VCO (PLL) may be 500 kHz to 1 MHz, that is, rather wide, in the receiving apparatus 5 configured to receive satellite broadcasting. On the other hand, in the receiving apparatus 6 configured to receive terrestrial digital broadcasting or cable television broadcasting, it is necessary to change an output frequency of a VCO with a small step width of 125 MHz to 166.7 MHz.

As a phase noise characteristic of a VCO (PLL), only performance of 10 kHz offset (10 kHz apart from a center frequency) or more is important in satellite broadcasting, and performance of 1 kHz offset or less is also important in terrestrial digital broadcasting or cable television broadcasting.

A frequency division ratio of a frequency divider may be small to be about 2 to 4 in the receiving apparatus 5 configured to receive satellite broadcasting when an oscillation frequency of a VCO is set to 2200 MHz to 4400 MHz. For example, the lowest frequency among input frequencies to the receiving apparatus 5 is 950 MHz, and in order to generate a local signal of 950 MHz, an output frequency of the VCO 511 (see FIG. 1) may be set to 1900 MHz and divided by 2 by the frequency divider 512, or may be set to 3800 MHz and divided by 4 by the frequency divider 512.

On the other hand, in the receiving apparatus 6 configured to receive terrestrial digital broadcasting or cable television broadcasting, when oscillation frequencies of the VCO 611 to the VCO 613 are set to 2200 MHz to 4400 MHz that are the same as those configured to receive satellite broadcasting, it is necessary to increase a range of a frequency division ratio to 4 to 64. For example, the lowest frequency among input frequencies to the receiving apparatus 6 is 44 MHz, and in order to generate a local signal of 44 MHz, it is necessary to set an output frequency of the VCO 611 (see FIG. 2) to 2816 MHz and divide the output frequency by 64 by a frequency divider not shown in the drawings.

In order to particularly ensure VCO (PLL) phase noise characteristic among the respective requirements shown in FIG. 3, it is effective not to increase an oscillation frequency of a VCO too high. Therefore, particularly in the receiving apparatus 6 of terrestrial digital broadcasting or cable television broadcasting in which performance of 1 kHz offset or less is also regarded as important, a plurality of VCOs are installed to keep an oscillation frequency of each VCO low as shown in FIG. 3.

For such a reason, in the receiving apparatus 5 configured to receive satellite broadcasting, the direct conversion scheme whereby it is possible to operate at a higher frequency is adopted. Also, in the receiving apparatus 6 configured to receive terrestrial digital broadcasting or cable television broadcasting, the super heterodyne scheme whereby it is easy to exhibit phase noise performance is adopted. In general, these receiving apparatuses are configured as respective dedicated tuners. Therefore, when circuits of these tuners are simply caused to be used in common for the purpose of reducing the number of parts, receiving characteristics of the tuners are thought to deteriorate.

<1-2. Configuration Example of Receiving Apparatus According to First Embodiment>

Figure 4:
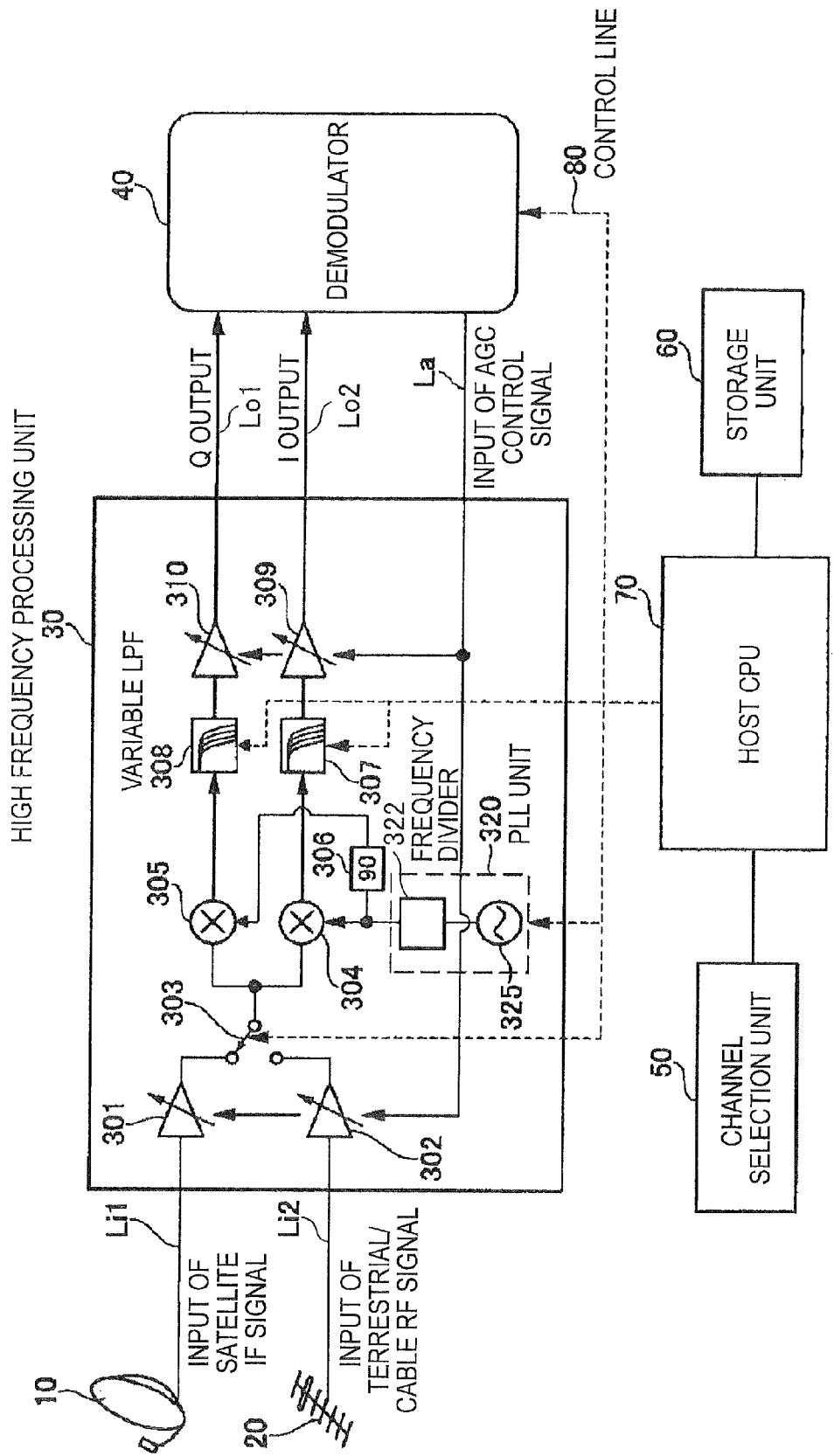
FIG. 4 is a block diagram showing a configuration example of a receiving apparatus according to a first embodiment of the present disclosure.

Next, a receiving apparatus according to a first embodiment of the present disclosure will be described with reference to FIG. 4 to FIG. 7. FIG. 4 shows a configuration example of a receiving apparatus 1 according to the first embodiment of the present disclosure. The receiving apparatus 1 has a parabola antenna 10 configured to receive satellite broadcasting, a UHF antenna 20 configured to receive terrestrial digital broadcasting and cable television broadcasting, a high frequency processing unit 30, and a demodulator 40.

The high frequency processing unit 30 has an AGC amplifier 301, an AGC amplifier 302, a switch 303 that selectively switches between outputs of the AGC amplifier 301 and the AGC amplifier 302, an I/Q mixer 304 serving as a first mixer, and an I/Q mixer 305 serving as a second mixer. In addition, the high frequency processing unit 30 has a PLL unit 320 serving as a local oscillator, a phase shifter 306, a variable LPF 307 serving as a first filter, a variable LPF 308 serving as a second filter, a baseband amplifier 309, and a baseband amplifier 310.

A satellite IF signal received by the parabola antenna 10 is input to the AGC amplifier 301 in the high frequency processing unit 30 via a signal line Li1. Based on an AGC control signal input from the demodulator 40 through a signal line La, the AGC amplifier 301 amplifies the satellite IF signal input from the signal line Li1 and outputs the amplified satellite IF signal. A terrestrial RF signal or an RF signal of cable television broadcasting (will be also referred to as an "RF signal" in brief below) received by the UHF antenna 20 is input to the AGC amplifier 302 in the high frequency processing unit 30 via a signal line Li2. Based on the AGC control signal input from the demodulator 40, the AGC amplifier 302 amplifies the RF signal input from the signal line Li2 and outputs the amplified RF signal. In this way, by separately installing AGC amplifiers for an IF signal of satellite broadcasting and an RF signal of terrestrial digital broadcasting or cable television broadcasting, it is possible to cover a difference in level between the two signals input to the high frequency processing unit 30. Here, the AGC amplifier 301 and the AGC amplifier 302 may configure one AGC amplifier having a wide variable gain range.

The satellite IF signal amplified by the AGC amplifier 301 and the RF signal of terrestrial digital broadcasting or cable television broadcasting amplified by the AGC amplifier 302 are connected to terminals of the switch 303. A connection point of the switch 303 is selectively switched, such that one of the satellite IF signal and the RF signal of terrestrial digital broadcasting or cable television broadcasting is input to the I/Q mixer 304 and the I/Q mixer 305. The I/Q mixer 304 mixes the one of the satellite IF signal and the RF signal selected by the switch 303 with an oscillation signal (local signal) output from the PLL unit 320, and thereby extracts a baseband signal of I phase. The I/Q mixer 305 mixes the one of the satellite IF signal and the RF signal selected by the switch 303 with an oscillation signal that is output from the PLL unit 320 and whose phase is shifted by 90° by the phase shifter 306, and thereby extracts a baseband signal of Q phase.

Figure 5:
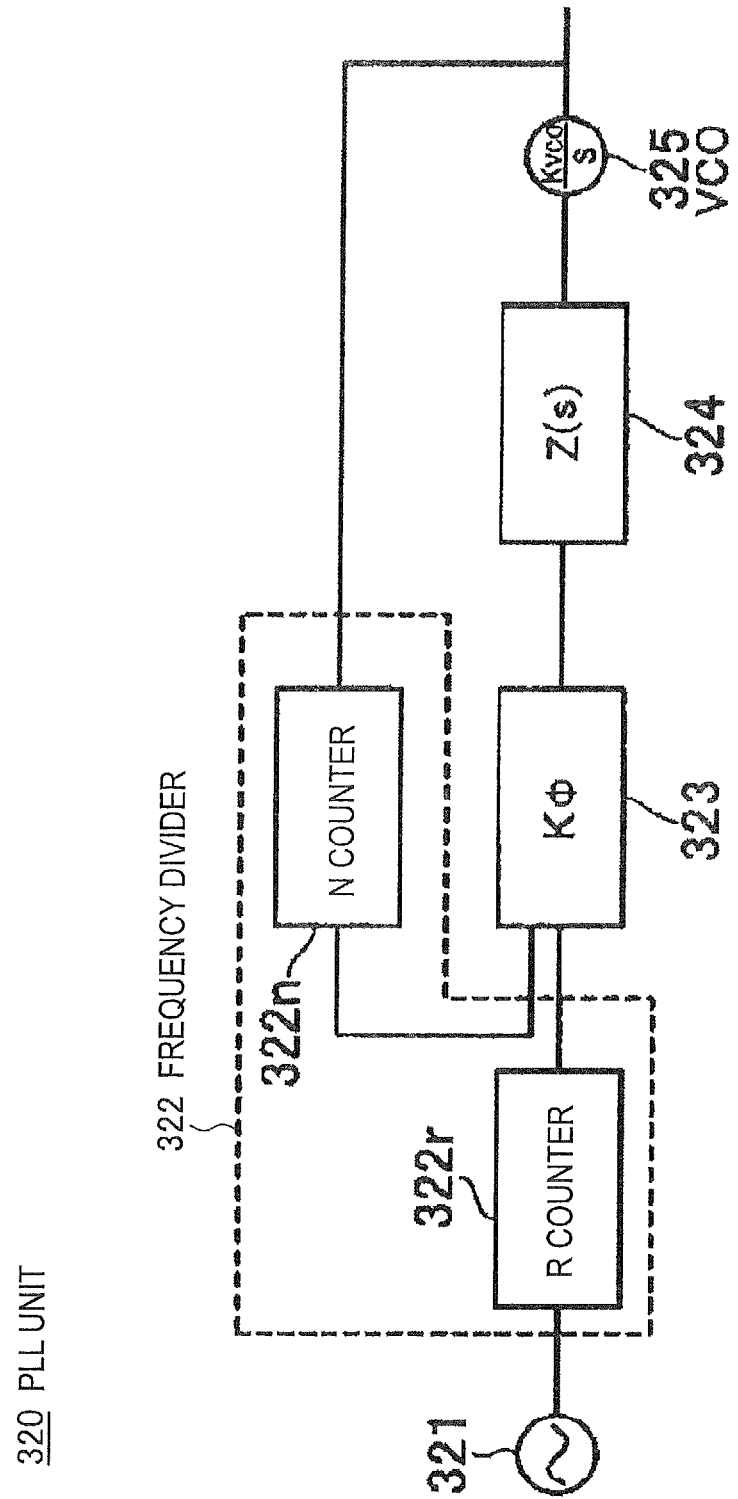
FIG. 5 is a block diagram showing a configuration example of a PLL unit according to the first embodiment of the present disclosure.

As a local oscillator, the PLL unit 320 generates the local signal of the same frequency as a reception frequency to be received by the parabola antenna 10 or the UHF antenna 20, and supplies the generated local signal to the I/Q mixer 304 and the phase shifter 306. The phase shifter 306 shifts the phase of the oscillation signal input from the PLL unit 320 by 90° and inputs the phase-shifted oscillation signal to the I/Q mixer 305. The receiving apparatus 1 according to this embodiment employs a fractional-N PLL capable of performing fractional frequency division as the PLL unit 320. FIG. 5 shows a configuration example of the PLL unit 320 configured with a fractional-N PLL circuit. Here, fractional frequency division denotes frequency division whereby a decimal point is included in a divided frequency, as will be described later.

As shown in FIG. 5, the PLL unit 320 is configured with a crystal oscillator 321 that oscillates a reference signal, a frequency divider 322, a phase comparator 323, a loop filter 324, and a VCO 325. The frequency divider 322 includes an R counter 322r and an N counter 322n. First, the reference signal oscillated by the crystal oscillator 321 is input to the R counter 322r, and subjected to R frequency division, that is, a frequency of the reference signal is divided by R, by the R counter 322r. The frequency subjected to R frequency division by the R counter 322r is input to the phase comparator 323 as a comparison frequency.

The phase comparator 323 compares a phase of the comparison frequency input from the R counter 322r with a phase of an oscillation signal that is oscillated by the VCO 325 and subjected to frequency division by the N counter 322n, and inputs a signal according to a phase difference (error signal) to the loop filter 324. The loop filter 324 converts the error signal input from the phase comparator 323 into a direct current voltage, and applies the direct current voltage to the VCO 325. The VCO 325 changes a frequency of the oscillated oscillation signal according to a level of the direct current voltage applied from the loop filter 324, and supplies the oscillated oscillation signal to the N counter 322n.

In general, when demodulation is performed using an I/Q signal, an oscillation frequency of a VCO is set to double or more a reception frequency because of easiness to obtain a phase difference of 90° and other reasons. In the receiving apparatus 1 according to this embodiment, it is also necessary to receive a broadcasting wave of satellite broadcasting transmitted using a high frequency band (950 MHz to 2150 MHz), and thus a range of an output frequency of the VCO 325 is 2200 MHz to 4400 MHz.

In order to enable handling of oscillation at such a high frequency, an LC resonant circuit used in a tuning unit of the VCO 325 according to this embodiment is configured by manufacturing a coil (tuning inductance) in an Integrated Circuit (IC). Specifically, a coil is mounted in a bare chip state on a substrate made up of, for example, Low Temperature Co-fired Ceramics (LTCC) and the like, and a cover is configured using a resin mold without wire bonding. With this configuration, an oscillator can be configured without using a bonding wire, and thus it is possible to keep a parasitic inductance value low in comparison with a case in which the LC resonant circuit is configured with, for example, a Ball Grid Array (BGA) and other cases.

In order to receive a radio wave of satellite broadcasting as well, in the receiving apparatus 1 of this embodiment, an oscillation frequency of the VCO 325 becomes very high as described above. In such a case, in order to increase a Q value of a resonant circuit, a value of a tuning inductance L is necessary to be a small value. When an oscillation frequency is a several GHz band, it is preferable to set the value of the tuning inductance L to a small value of, for example, about 10 nH. However, in an oscillator circuit of which a value of L is lowered like this, an influence of a parasitic inductance upon a resonant frequency is also increased. In other words, the greater a parasitic inductance, the higher a probability of an error in a resonant frequency or a parasitic oscillation becomes.

Since an LC resonant circuit part of the VCO 325 is configured by manufacturing a coil in the IC, the receiving apparatus 1 of this embodiment becomes able to control a parasitic inductance to be as small as can be ignored regarding the influence. In this way, an error in a resonant frequency or a parasitic oscillation becomes difficult to occur, and an oscillation operation of the VCO 325 is stabilized. In addition, the LC resonant circuit part of the VCO 325 is configured by manufacturing a coil in the IC, and thereby the number of parts of the circuit can be reduced. Further, as a configuration having a coil built in an IC, a spiral coil may be configured by drawing a pattern of a conductive unit on a silicon chip. With such a configuration, a parasitic inductance can be controlled to be a lower value.

In a configuration having a coil for oscillation built in an IC, a Q value becomes lower in comparison with, for example, a case in which an air-core coil is used as the tuning inductance L of the resonant circuit. However, by raising the comparison frequency, it is possible to reduce phase noise in a loop band. As mentioned above, the PLL unit 320 is configured with a fractional-N PLL circuit, and thus, it becomes possible to raise the comparison frequency while keeping a minimum step frequency low. In other words, it is possible to satisfy necessary characteristics demanded for receiving terrestrial digital broadcasting or cable television broadcasting as well as necessary characteristics of a tuner demanded for receiving satellite broadcasting.

Referring back to FIG. 5 for description, the N counter 322n is configured with a variable frequency divider and an accumulator that are not shown in the drawings. The variable frequency divider includes an N frequency divider that divides the frequency of the oscillation signal input from the VCO 325 by N, and an N+1 frequency divider that divides the frequency of the oscillation signal input from the VCO 325 by N+1. The accumulator selects the N+1 frequency divider K times among F times of output pulses (count values) from the variable frequency divider, and the N frequency divider F-K times. With such a configuration, (N+K/F) is equivalently obtained as an average frequency division number.

For example, it is assumed that N is 900 MHz, F is 5, and K is 1. When F is 1 to 4, the N frequency divider is selected, and thus an output frequency from the N counter 322n becomes 900 MHz. When F becomes 5, the N+1 counter is selected, and the output frequency from the N counter 322n becomes 901 MHz (=900 MHz+100 kHz). After all, it becomes possible to change an output frequency of the PLL unit 320 with a step width (fractional frequency division ratio) of (N+K/F)=(90+1/5)=900.2 MHz. In other words, it is possible to lower the minimum step frequency of the PLL unit 320. Here, the setting values of N, F, and K are an example, and N, F, and K are not limited to this example.

In this embodiment, a frequency division ratio of the frequency divider 322 includes the R counter 322r and the N counter 322n can be varied between 2 and 64. With such a configuration, it is possible to set a range of a frequency that can be oscillated by the PLL unit 320 to a wide range of 34.375 MHz (2200 MHz/64 frequency division) to 2200 MHz (4400 MHz/2 frequency division). In this way, the PLL unit 320 becomes able to generate a frequency used to receive not only a frequency band of a satellite IF signal but also a VHF band and a UHF band that are frequency bands of terrestrial digital broadcasting or cable television broadcasting.

Referring back to FIG. 4 for description, the oscillation signal (local signal) output from the PLL unit 320 is mixed with the satellite IF signal or the RF signal by the I/Q mixer 304 and the I/Q mixer 305, and converted into the baseband signals of I phase and Q phase. The respective baseband signals of I phase and Q phase are input to the variable LPF 307 and the variable LPF 308. The variable LPF 307 limits a frequency of the baseband signal of I phase to a predetermined band and outputs the baseband signal of I phase to the baseband amplifier 309. Also, the variable LPF 308 limits a frequency of the baseband signal of Q phase to a predetermined band and outputs the baseband signal of Q phase to the baseband amplifier 310.

The variable LPF 307 and the variable LPF 308 are configured as programmable variable LPFs. In other words, cut-off frequencies of the variable LPFs 307 and 308 are set to setting values in a register not shown in the drawings. In this embodiment, a range of the setting values is 3 MHz to 20 MHz. With such a setting, it becomes possible to obtain both of a broadcasting wave of terrestrial digital broadcasting or cable television broadcasting whose occupied bandwidth is 6 MHz to 8 MHz and a broadcasting wave of satellite broadcasting whose occupied bandwidth is 20 MHz to 40 MHz by causing the broadcasting waves to go through the variable LPF 307 and the variable LPF 308.

The baseband signal of I phase having gone through the variable LPF 307 is adjusted in gain by the baseband amplifier 309, and then input to the demodulator 40 through a signal line Lo2. Also, the baseband signal of Q phase having gone through the variable LPF 308 is adjusted in gain by the baseband amplifier 310, and then input to the demodulator 40 through a signal line Lo1. Gains of the baseband amplifier 309 and the baseband amplifier 310 are adjusted based on the AGC control signal input from the demodulator 40 through the signal line La.

Figure 6:
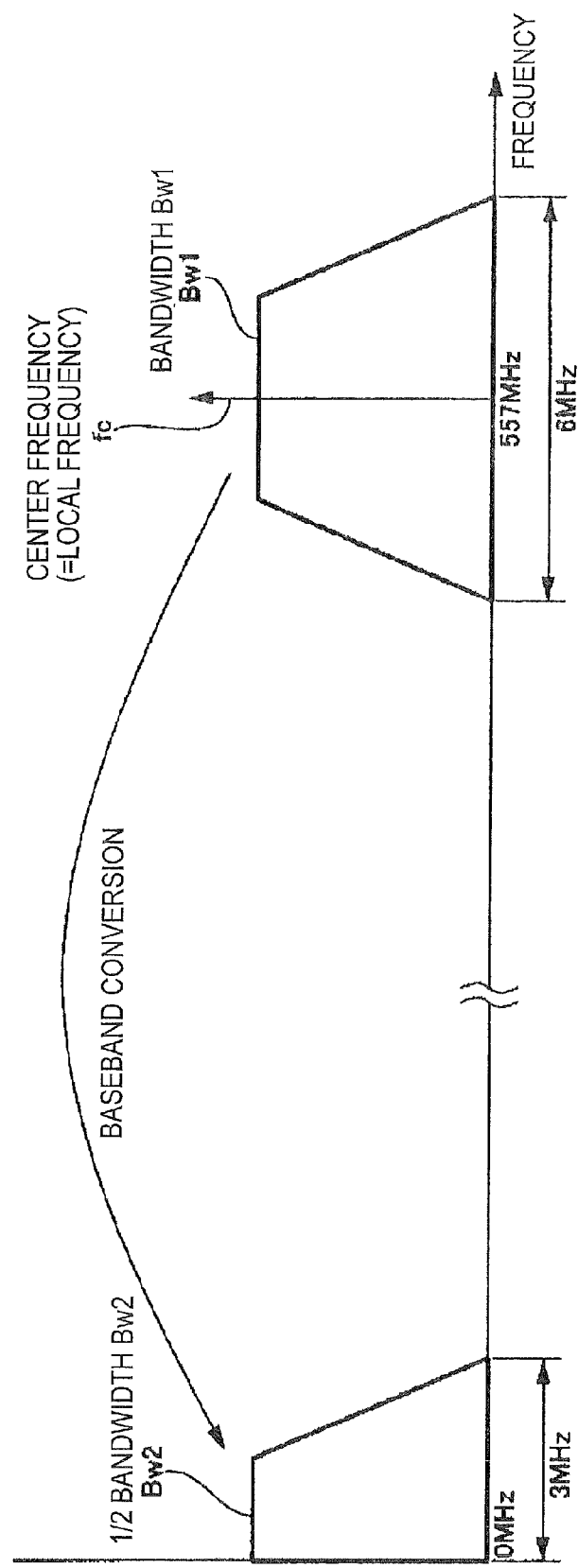
FIG. 6 is an explanatory diagram showing an example of a baseband conversion process of a high frequency processing unit according to the first embodiment of the present disclosure.

FIG. 6 is a diagram showing an image of extraction of baseband signal (baseband conversion) by the I/Q mixers 304 and 305, and band limiting by the variable LPF 307 and the variable LPF 308. A horizontal axis of FIG. 6 denotes frequency (MHz), and a vertical axis denotes signal level. In FIG. 6, an example of detecting a signal of 557 MHz set as a reception frequency among RF signals received by the UHF antenna 20 is shown. In this case, the PLL unit 320 (see FIG. 1) generates a local signal of the same frequency as the reception frequency, that is, 557 MHz. Then, the I/Q mixer 304 and the I/Q mixer 305 multiply the local signal and the RF signal amplified by the AGC amplifier 302 (see FIG. 1).

In this way, as shown in FIG. 6, a center frequency fc is 557 MHz that is the same as a frequency of the local signal (local frequency), and a signal of which a bandwidth Bw1 is 6 MHz is extracted and subjected to baseband conversion. In other words, the RF signal that is received by the UHF antenna 20 and amplified by the AGC amplifier 302 is converted into a baseband signal whose center frequency fc is 0 MHz. In addition, the baseband signal extracted in this way goes through the variable LPF 307 and the variable LPF 308, and thereby a bandwidth Bw2 of the baseband signal is limited to ½. In other words, the receiving apparatus 1 according to this embodiment performs wave detection using the direct conversion scheme.

Referring back to FIG. 4 again, description continues. The demodulator 40 demodulates the respective input baseband signals of I phase/Q phase using a predetermined demodulation scheme, and outputs the demodulated baseband signals as Transport Stream (TS) signals. In this embodiment, the demodulator 40 is configured to perform demodulation using a demodulation scheme corresponding to respective broadcasting standards of terrestrial digital broadcasting, cable television broadcasting, and satellite broadcasting. In other words, demodulation of a signal is performed using a demodulation scheme corresponding to a modulation scheme adopted by ISDB-T that is a broadcasting form of terrestrial digital broadcasting, a modulation scheme used in cable television broadcasting, and a modulation scheme adopted by ISDB-S that is a broadcasting form of satellite broadcasting. The TS signals demodulated by the demodulator 40 are decoded by a Moving Picture Experts Group (MPEG) decoder not shown in the drawings, and a video signal and an audio signal are extracted.

In addition, the receiving apparatus 1 has a channel selection unit 50, a storage unit 60, and a host CPU 70 serving as a control unit. The channel selection unit 50 is configured as a remote controller or the like, and transmits information on a channel selected by a user to the host Central Processing Unit (CPU) 70 as channel selection data. The storage unit 60 includes a non-volatile memory or the like, and stores the channel selection data and setup data corresponding to the channel selection data. Generation of channel selection data is not only performed when a channel is selected through the channel selection unit 50 configured as a remote controller. For example, even when a specific program is selected through a electronic program guide (EPG), or a specific program is selected for recording reservation, channel selection data is generated.

The host CPU 70 controls the respective units configuring the receiving apparatus 1, and in particular, reads setup data necessary to receive a broadcast of the selected channel from the storage unit 60 based on the channel selection data and sets the respective units of the receiving apparatus 1 based on the read setup data.

FIG. 7 shows an example of control by the host CPU 70 as a flowchart. First, channel selection data transmitted from the channel selection unit 50 or channel selection data generated based on a channel selection made through EPG or recording reservation is loaded (step S1). Then, it is determined whether or not the selected channel is a channel of terrestrial digital broadcasting (step S2). When the selected channel is a channel of terrestrial digital broadcasting, the respective units of the receiving apparatus 1 are set for receiving terrestrial digital broadcasting (step S3), and the process returns to step S1. When it is determined in step S2 that the selected channel is not a channel of terrestrial digital broadcasting, it is determined next whether or not the selected channel is a channel of cable television broadcasting (step S4). When it is determined that the selected channel is a channel of cable television broadcasting, the respective units of the receiving apparatus 1 are set for receiving cable television broadcasting (step S5), and the process returns to step S1.

When it is determined in step S4 that the selected channel is not a channel of cable television broadcasting, it is determined next whether or not the selected channel is a channel of satellite broadcasting (step S6). When it is determined that the selected channel is a channel of satellite broadcasting, the respective units of the receiving apparatus 1 are set for receiving satellite broadcasting (step S7), and the process returns to step S1. Even when the selected channel does not correspond to any of the aforementioned broadcasting, the process returns to step S1.

FIG. 8 shows an example of a setting made by the host CPU 70. As setting items, there are "Connection point of switch," "Output frequency of VCO," "Frequency division ratio of frequency divider," "Cut-off frequency of variable LPF," and "Broadcasting standard of demodulator (demodulation scheme)." First, description will be made regarding a setting made by the host CPU 70 when a channel of terrestrial digital broadcasting is selected. When a channel of terrestrial digital broadcasting is selected, a connection point of the switch 303 (see FIG. 4) is switched to the AGC amplifier 302. In this way, an RF signal that is received by the UHF antenna 20 and amplified by the AGC amplifier 302 is input to the I/Q mixer 304 and the I/Q mixer 305 through the switch 303.

An output frequency of the VCO 325 of the PLL unit 320 is set to an appropriate frequency in a range of 2200 MHz to 4400 MHz. In other words, a frequency according to a reception frequency determined by the selected channel is oscillated as the output frequency in the range of 2200 MHz to 4400 MHz. A frequency division ratio of the frequency divider 322 is set to an appropriate value between 4 and 64. The output frequency of the VCO 325 and the frequency division ratio of the frequency divider 322 are set in this way, such that a local frequency of 44 MHz to 870 MHz is oscillated by the PLL unit 320. In other words, a frequency that is the same as used to transmit a broadcasting wave of terrestrial digital broadcasting is oscillated.

Cut-off frequencies of the variable LPF 307 and the variable LPF 308 are set to appropriate values between 3 MHz and 4 MHz. For this reason, only a frequency of 6 MHz to 8 MHz that is a bandwidth of one channel of terrestrial digital broadcasting is passed through the variable LPF 307 and the variable LPF 308. A broadcasting scheme corresponding to a demodulator is switched to the ISDB-T scheme, and the OFDM scheme or the 8VSB scheme is set as a demodulation scheme.

Even when a channel of cable broadcasting is selected, substantially the same setting is made as in a case in which a channel of terrestrial digital broadcasting is selected. A difference is in the demodulation scheme of the demodulator 40. When a cable broadcast is received, a demodulation scheme according to a modulation scheme for transmitting cable television broadcasting, that is, a demodulation scheme such as 64 QAM, 128 QAM, 256 QAM, or the like, is selected.

When a channel of satellite broadcasting is selected, the connection point of the switch 303 (see FIG. 4) is switched to the AGC amplifier 301 by the host CPU 70. Accordingly, a satellite IF signal that is received by the parabola antenna 10 and amplified by the AGC amplifier 301 is input to the I/Q mixer 304 and the I/Q mixer 305 through the switch 303.

The output frequency of the VCO 325 of the PLL unit 320 is set to an appropriate frequency in a range of 2200 MHz to 4400 MHz. In other words, a frequency according to a reception frequency determined by the selected channel is oscillated as the output frequency in the range of 2200 MHz to 4400 MHz. A frequency division ratio of the frequency divider 322 is set to an appropriate value between 2 and 4. The output frequency of the VCO 325 and the frequency division ratio of the frequency divider 322 are set in this way, such that a local frequency of 950 MHz to 21500 MHz is oscillated by the PLL unit 320. In other words, a frequency that is the same as used to transmit a broadcasting wave of satellite broadcasting is oscillated.

Cut-off frequencies of the variable LPF 307 and the variable LPF 308 are set to appropriate values between 10 MHz and 20 MHz. For this reason, only a frequency of 20 MHz to 40 MHz that is a bandwidth of one channel of satellite broadcasting is passed through the variable LPF 307 and the variable LPF 308. A broadcasting scheme corresponding to a demodulator is switched to an ISDB-S scheme, and the QPSK scheme or the 8PSK scheme is set as a demodulation scheme.

As described above, in the receiving apparatus 1 according to this embodiment, settings of the respective units configuring the high frequency processing unit 30 (see FIG. 4) and a setting of the demodulator 40 are changed with settings according to channel selection data under the control of the host CPU 70. In this way, by means of the one high frequency processing unit 30 and the demodulator 40, it is possible to receive a plurality of broadcasting waves of different broadcasting schemes, such as terrestrial digital broadcasting, satellite broadcasting, and the like. Therefore, a size of a circuit configuring the high frequency processing unit 30 and the demodulator 40 is remarkably reduced, and a circuit mounting area is also reduced. Thus, it is possible to reduce a size and a production cost of the receiving apparatus 1.

Also, in the receiving apparatus 1 according to this embodiment, a broadcasting wave of terrestrial digital broadcasting and a broadcasting wave of cable television broadcasting are also demodulated using the direct conversion scheme. In other words, since it is unnecessary to convert a reception signal into an IF signal as in wave detection using the super heterodyne scheme, it is possible to simplify a circuit configuration and reduce a size of a circuit.

Also, in the receiving apparatus 1 according to this embodiment, the PLL unit 320 is configured as a fractional-N PLL circuit. Accordingly, it is possible to reduce a minimum step frequency of the PLL unit 320 (frequency divider 322). In other words, it is allowed to change a frequency of a local signal with a fine step width, and thus it is also possible to set a fine minimum step frequency of 125 kHz to 166.7 kHz necessary to receive terrestrial digital broadcasting or cable television broadcasting.

Also, by configuring the PLL unit 320 as a fractional-N PLL circuit, it is possible to set a frequency division number of (N+K/F), and thus a comparison frequency can be raised to F times that of a general PLL. For example, when it is satisfied that F=5, it is possible to raise a comparison frequency by five times. By raising the comparison frequency, loop gain around a center frequency of the VCO 325, for example, at 1 kHz offset point, is increased. Accordingly, it is possible to phase noise in a loop band. Therefore, it becomes also possible to satisfy phase noise performance of 1 kHz or less that is necessary for a receiving apparatus for terrestrial digital broadcasting or cable television broadcasting.

Also, in the receiving apparatus 1 according to this embodiment, an LPF that limits a band of a baseband signal of I phase or Q phase generated by the I/Q mixer 304 or 305 is configured as a variable LPF. Accordingly, even in a region in which a plurality of broadcasting waves of the same channel are transmitted from radio towers in different installation regions using carrier waves of different frequencies, it becomes possible to certainly receive a broadcasting wave of a desired channel.

Also, most MPEG decoders conventionally used to receive digital broadcasts have two systems for processing a TS signal, but it is expected that the number of TS signal processing systems will be increased to four or eight in the future. Digital modulation and modulation technology used in modulation and demodulation of digital broadcasting has a characteristic of robustness against mutual interference between pieces of data, and thus it is theoretically thought that an increase in processing systems can also be handled. Even in such a case, it becomes unnecessary to install as many high frequency processing units 30 (tuner units) as TS signal processing systems in the receiving apparatus 1 according to this embodiment. Therefore, in actual design of a circuit, it is possible to prevent a problem such as lack of circuit arrangement space and the like.

Also, in a receiving apparatus configured to be able to receive a plurality of types of broadcasting waves, it is important for a high frequency processing unit (tuner unit) to distribute an input signal from an antenna in appropriate shares. In implementation of distribution in appropriate shares, it becomes effective to configure high frequency processing units that handle different broadcasting waves with the same circuit, or to symmetrically dispose respective high frequency processing units using a point to which a satellite IF signal or an RF signal obtained by an antenna is input as a central point. According to the receiving apparatus 1 of this embodiment, the number of high frequency processing units can be reduced, and thus it becomes possible to implement such a circuit configuration relatively readily. Therefore, it becomes easy to handle an increase in TS signal processing systems of a decoder or the like.

<1-3. Various Modified Examples>

Figure 9:
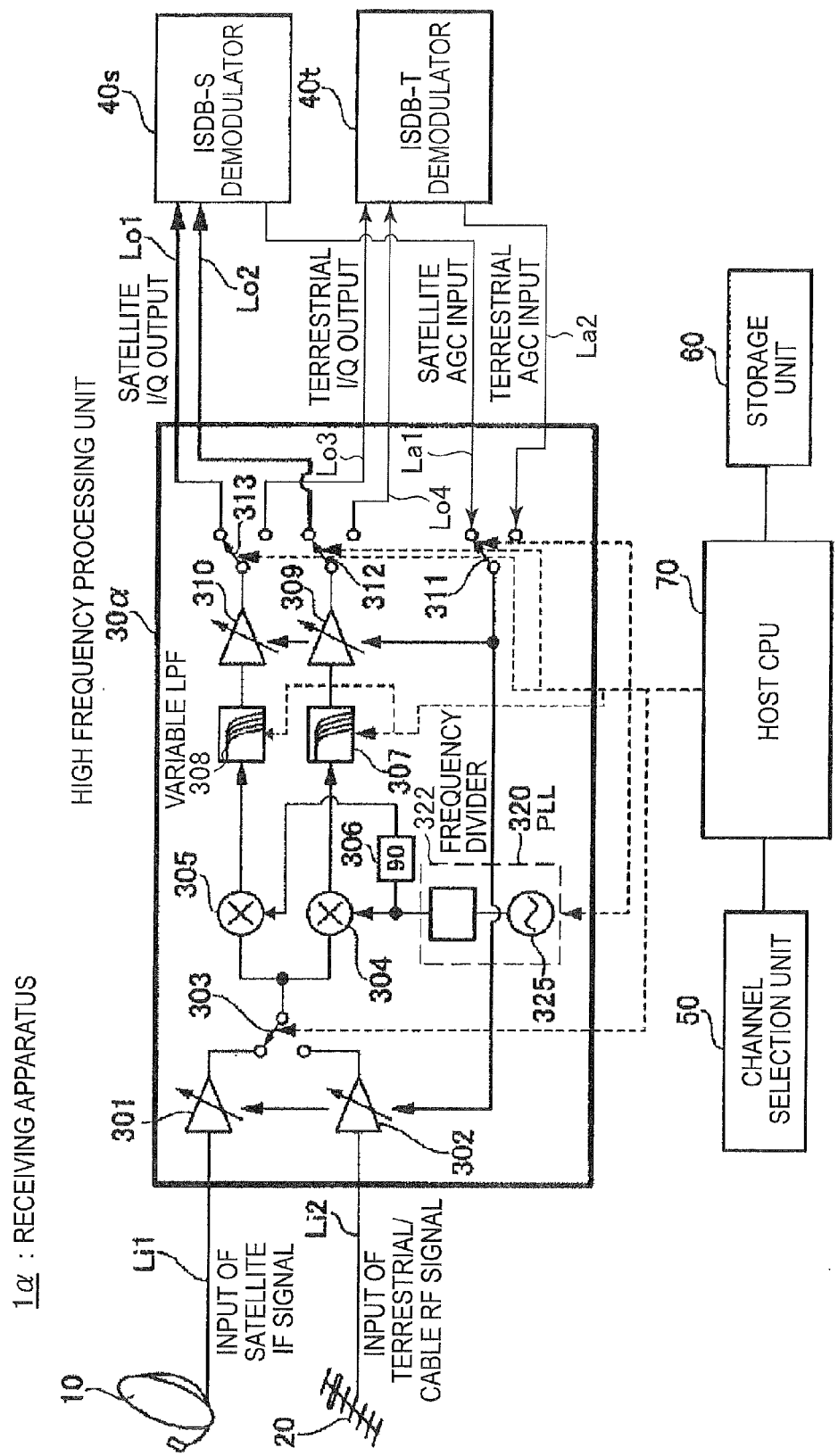
FIG. 9 is a block diagram showing a configuration example of a receiving apparatus according to another embodiment of the present disclosure.

The embodiment described above is exemplified with a case in which the one demodulator 40 performs demodulation according to various demodulation schemes of different broadcasting standards such as ISDB-T, ISDB-S, and the like, but is not limited to the case. According to types of received broadcasting waves, a plurality of demodulators may be installed. FIG. 9 shows a configuration example of a receiving apparatus 1α in which an ISDB-S demodulator 40s (first demodulator) that demodulates a broadcasting wave of satellite broadcasting and an ISDB-T demodulator 40t (second demodulator) that demodulates a broadcasting wave of terrestrial digital broadcasting are separately installed. In FIG. 9, parts corresponding to FIG. 4 are indicated by the same coincidences, and detailed description thereof will be omitted.

In the receiving apparatus 1α shown in FIG. 9, each of the ISDB-S demodulator 40s and the ISDB-T demodulator 40t has two input terminals. In addition, a switch 311 and a switch 312 that switch between output points of a baseband amplifier 309 and a baseband amplifier 310 are installed. Further, a switch 313 that switches between output points of an AGC control signal is also installed. Control performed by a host CPU 70 is similar to that shown in FIG. 7.

When a broadcasting wave of satellite broadcasting is received, connection points of the switch 311 and the switch 312 are switched to the ISDB-S demodulator 40s based on control by the host CPU 70. In other words, the baseband amplifier 310 and the baseband amplifier 309 are connected to a signal line Lo1 and a signal line Lo2 connected with the ISDB-S demodulator 40s. Accordingly, baseband signals of I phase and Q phase extracted from a satellite IF signal are input to the ISDB-S demodulator 40s and demodulated. Also, a connection point of the switch 313 is switched to the ISDB-S demodulator 40s. In other words, an AGC amplifier 301, an AGC amplifier 302, the baseband amplifier 309, and the baseband amplifier 310 are connected to a control line La1 connected with the ISDB-S demodulator 40s. Accordingly, an AGC control signal for receiving satellite broadcasting generated by the ISDB-S demodulator 40s is input to the AGC amplifier 301, the AGC amplifier 302, the baseband amplifier 309, and the baseband amplifier 310 through the control line La1.

When a broadcasting wave of terrestrial digital broadcasting is received, the connection points of the switch 311 and the switch 312 are switched to the ISDB-T demodulator 40t based on control by the host CPU 70. In other words, the baseband amplifier 310 and the baseband amplifier 309 are connected to a signal line Lo3 and a signal line Lo4 connected with the ISDB-T demodulator 40t. Accordingly, baseband signals of I phase and Q phase extracted from an RF signal are input to the ISDB-T demodulator 40t and demodulated. Also, the connection point of the switch 313 is switched to the ISDB-T demodulator 40t. In other words, the AGC amplifier 301, the AGC amplifier 302, the baseband amplifier 309, and the baseband amplifier 310 are connected to a control line La2 connected with the ISDB-T demodulator 40t. Accordingly, an AGC control signal for receiving terrestrial digital broadcasting generated by the ISDB-T demodulator 40t is input to the AGC amplifier 301, the AGC amplifier 302, the baseband amplifier 309, and the baseband amplifier 310 through the control line La2.

Even with such a configuration, it is possible to obtain similar effects to those obtained in the embodiment described above. In addition, since it is possible to use a conventionally used ISDB-S demodulator and ISDB-T demodulator as they are, production cost of a receiving apparatus is reduced.

FIG. 9 is exemplified with a case of receiving satellite broadcasting and terrestrial digital broadcasting, but is not limited to this combination. It is possible to receive broadcasting waves in various combinations of, for example, satellite broadcasting and cable television broadcasting, satellite and satellite, terrestrial and terrestrial, and the like.

In general, in a receiving apparatus including a plurality of high frequency processing units (tuner units), some of the high frequency processing units are kept electrified and ready to start at all times even when no broadcast is actually received. When high frequency processing units are installed in proportion to types of broadcasting waves to be received or types of combinations, stand-by power consumption that is consumed in such a state becomes too high. However, by configuring the receiving apparatus 1α as shown in FIG. 9, a one high frequency processing unit 30α can receive a plurality of types of broadcasting waves in various combinations. In other words, stand-by power consumption can be remarkably reduced.

[2. Second Embodiment]
<2-1. Configuration Example of Receiving Apparatus>

Figure 10:
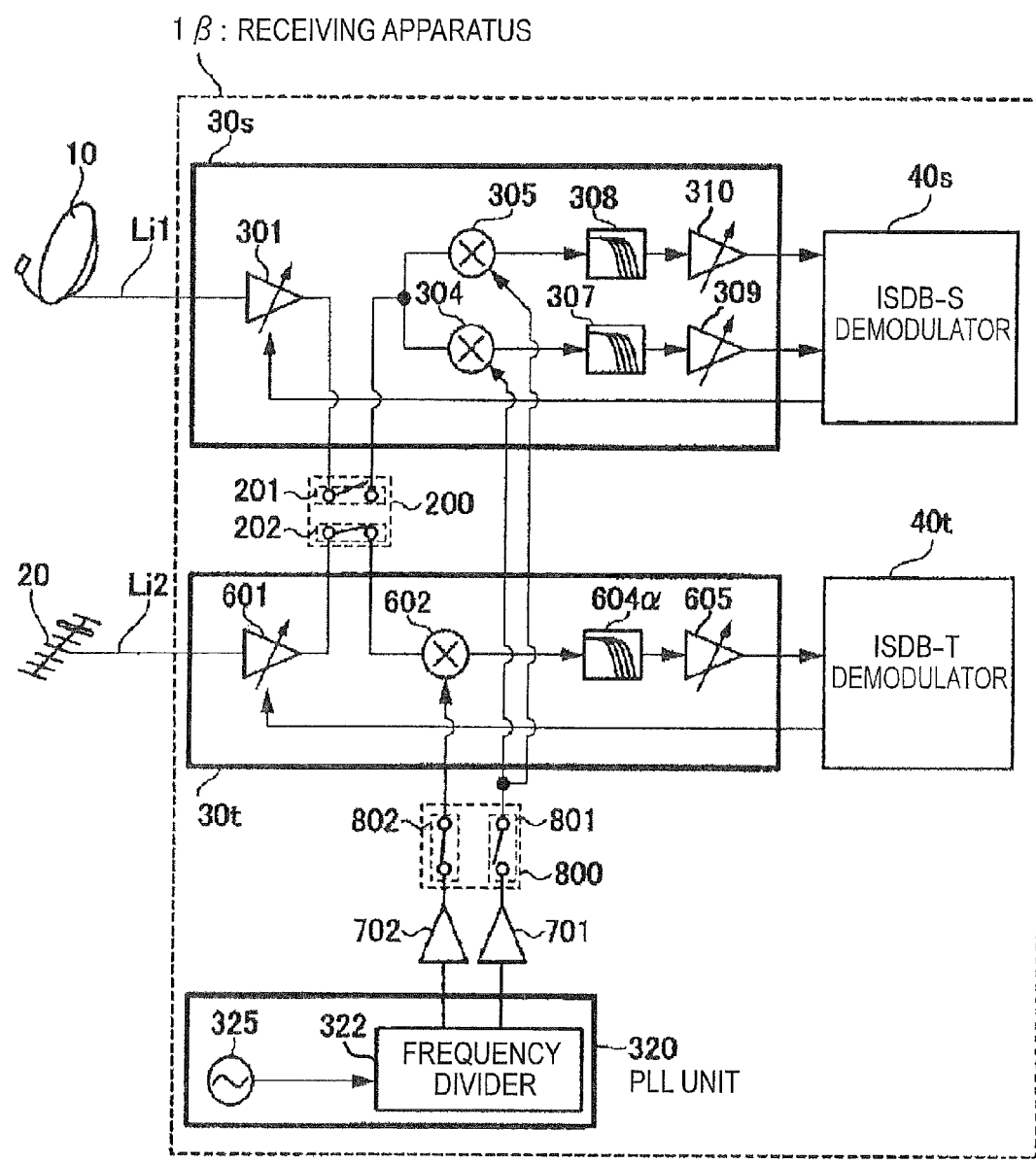
FIG. 10 is a block diagram showing a configuration example of a receiving apparatus according to a second embodiment of the present disclosure.

Next, a configuration example of a receiving apparatus 1β according to a second embodiment of the present disclosure will be described with reference to a block diagram of FIG. 10. In FIG. 10, parts corresponding to FIG. 1, FIG. 2, FIG. 4, and FIG. 9 are denoted by the same symbols, and repeated description thereof will be omitted.

The receiving apparatus 1β according to this embodiment has a high frequency processing unit 30s that detects a satellite IF signal using the direct conversion scheme, and a high frequency processing unit 30t that detects a terrestrial RF signal using the super heterodyne scheme. In the configuration, when a broadcast is received, one of the high frequency processing units 30s and 30t is selected by a switch unit 200 serving as a first switch unit. The switch unit 200 includes a switch 201 and a switch 202. The switch 201 turns on or off a connection between an AGC amplifier 301 of the high frequency processing unit 30s on a satellite broadcasting receiving side and a first mixer 304 and a second mixer 305 of the following stage. The switch 202 turns on or off a connection between an AGC amplifier 601 of the high frequency processing unit 30t on a terrestrial digital broadcasting receiving side and a mixer 602 of the following stage.

A switching operation of the switches 201 and 202 by the switch unit 200 is controlled by a host CPU 70 (see FIG. 4 and FIG. 9) serving as a control unit. The host CPU 70 commands the switch unit 200 to perform a switching operation at a timing at which new channel selection data is supplied from a channel selection unit 50, or at other timings. Also, the host CPU 70 controls a high frequency processing unit 30 in which no broadcasting wave is received to enter a power-off mode.

In the power-off mode, electric current is supplied to a block (output amplifier) that outputs a signal to an Analog/Digital (A/D) converter (not shown in the drawings) connected to the following stage among respective blocks configuring a high frequency processing unit 30, and the supply of electric current to the other blocks is interrupted. As the block that outputs a signal to an ADC of the following stage, the baseband amplifiers 309 and 310 of the high frequency processing unit 30s and an IF amplifier 605 of the high frequency processing unit 30t are shown in FIG. 10.

For example, the baseband amplifiers 309 and 310 of the high frequency processing unit 30s and the IF amplifier 605 of the high frequency processing unit 30t are supplied with a predetermined bias voltage at all times, and the bias voltage is output as a DC voltage when the power-off mode is entered. By setting the bias voltage to a value that causes output voltages of these output amplifiers to become a midpoint potential, even in a connection state in which an A/D converter is galvanically and directly connected to the following stage, it is possible to prevent an input terminal of the A/D converter from entering an uncertain state.

In the configuration of the receiving apparatus 1β shown in FIG. 10, a PLL unit 320 serving as a local oscillator is shared by the high frequency processing unit 30s and the high frequency processing unit 30t. Like that shown as in the first embodiment, the PLL unit 320 is configured with a fractional-N PLL circuit. In this embodiment, output buffer amplifiers that buffer a local oscillation signal output from a frequency divider 322 of the PLL unit 320 are installed to correspond to the number of output points of the local oscillation signal. In this embodiment, the output points of the local oscillation signal are two, that is, the mixers 304 and 305 of the high frequency processing unit 30s and the mixer 602 of the high frequency processing unit 30t. For this reason, the configuration has an output buffer amplifier 701 that buffers a local oscillation signal input to the mixers 304 and 305 of the high frequency processing unit 30s, and an output buffer amplifier 702 that buffers a signal input to the mixer 602 of the high frequency processing unit 30t. In addition, there are a switch 801 that turns on or off a connection between the frequency divider 322 and the mixers 304 and 305, and a switch 802 that turns on or off a connection between the frequency divider 322 and the mixer 602.

One of connection points of a switch unit (second switch unit) 800 including the switches 802 and 802 is selected by the host CPU 70 (see FIG. 4 and the like). The host CPU 70 turns on a switch connected to a mixer of a high frequency processing unit 30 having not been set to the power-off mode, that is, a side receiving a broadcasting wave, and turns off a switch connected to a mixer of a high frequency processing unit 30 having been set to the power-off mode. For example, when satellite broadcasting is received, the switch 801 connected to the mixers 304 and 305 of the high frequency processing unit 30s is turned on, and the switch 802 connected to the mixer 602 of the high frequency processing unit 30t is turned off.

In addition, the host CPU 70 applies a predetermined voltage, for example, 1.5 V or the like, to an output buffer amplifier on a side whose switch is turned on and that is connected with a mixer, and controls an impedance of an output buffer amplifier on a side whose switch is turned off to be a predetermined high value. By performing such control, an overall load becomes 1.5 V at all times when the buffer side is seen from the frequency divider 322. Therefore, even when the power-off mode is entered, and the power of a mixer of any one high frequency processing unit 30, that is, an output point of the local oscillation signal, is turned off, an impedance mismatch does not occur between the frequency divider 322 and the mixer.

<2-2. Example of Receiving Process of Receiving Apparatus>

Next, an example of a receiving process of the receiving apparatus 1β according to this embodiment will be described with reference to the flowchart of FIG. 11. First, the host CPU 70 loads channel selection data (step S11), and determines whether or not a selected channel is a channel of terrestrial digital broadcasting (step S12). When the selected channel is a channel of terrestrial digital broadcasting, a connection point of the switch unit 200 serving as the first input switch unit is switched to the high frequency processing unit 30t on the terrestrial digital broadcasting receiving side (step S13). Then, the high frequency processing unit 30s on the satellite broadcasting receiving side is set to the power-off mode (step S14), and a process as described above is performed. Subsequently, a VCO output frequency of the PLL unit 320 and a frequency division ratio of the frequency divider 322 are set to appropriate values for receiving terrestrial digital broadcasting (step S15), and a process of detecting a broadcasting signal, that is, a terrestrial RF signal, is performed (step S16).

When it is determined in step S12 that the selected channel is a channel of satellite broadcasting, the connection point of the switch unit 200 is switched by the host CPU 70 to the high frequency processing unit 30s on the satellite broadcasting receiving side (step S17). Then, a control of setting the high frequency processing unit 30t on the terrestrial digital broadcasting receiving side to the power-off mode is performed (step S18). Subsequently, the VCO output frequency of the PLL unit 320 and the frequency division ratio of the frequency divider 322 are set to appropriate values for receiving satellite broadcasting (step S19), and a process of detecting a broadcasting signal, that is, a satellite IF signal, is performed (step S16). After the process is performed thus far, the process returns to step S11 and continues.

According to the embodiment described above, it becomes possible to detect a broadcasting signal of a wide frequency band from terrestrial digital broadcasting to satellite broadcasting using only one local oscillator configured as a fractional-N type. Accordingly, it is possible to reduce a mounting area of a high frequency processing unit 30 in an IC.

Also, according to the embodiment described above, since a high frequency processing unit 30 that receives no broadcasting signal is put in the power-off mode, and power supply is interrupted, it becomes possible to hold down power consumption. At this time, electric current is supplied to the baseband amplifiers 309 and 310 serving as output amplifiers and the IF amplifier 605, and output voltages are controlled to be a predetermined DC voltage (midpoint potential), such that an input terminal of an A/D converter of the following stage is not put in the uncertain state.

Also, according to the embodiment described above, an output of the frequency divider 322 is distributed to correspond to an output point of the output, and a connection point of the output is switched to a high frequency processing unit 30 receiving a broadcasting signal by the switch unit 800 serving as the second switch unit. At this time, a predetermined voltage is applied to an output buffer amplifier to which a switch is connected, and an output buffer amplifier on a side whose switch is turned off is controlled to have a high impedance. Accordingly, even when an output point of a local oscillation signal is switched, the impedance is matched between the output point and the output buffer amplifier, and thus the local oscillation signal is correctly transmitted to a mixer.

In other words, without causing a reception characteristic of a broadcasting signal to deteriorate, it is possible to reduce a circuit size because the number of local oscillators is limited to one.

Also, in the embodiment described above, detection of a broadcasting signal is performed by switching between the high frequency processing unit 30t configured to receive terrestrial digital broadcasting and the high frequency processing unit 30s configured to receive satellite broadcasting. Accordingly, for example, even when there is the existing high frequency processing unit 30t that is used to receive terrestrial digital broadcasting and performs wave detection according to the super heterodyne scheme, the configuration can be kept as it is. After all, it becomes possible to relatively readily perform a process of adding the high frequency processing unit 30s that is used to receive satellite broadcasting and performs wave detection according to the direct conversion scheme to the existing configuration, and other processes.

Also, by installing a plurality of sets of the high frequency processing unit 30s and the high frequency processing unit 30t shown in FIG. 10, it becomes possible to receive broadcasting waves not only in the combination of terrestrial digital broadcasting and satellite broadcasting but also in various combinations. For example, it becomes possible to simultaneously view or record broadcasting programs in combinations of, for example, satellite broadcasting and satellite broadcasting, terrestrial digital broadcasting and terrestrial digital broadcasting, and the like.

The second embodiment described above is exemplified with a case in which a plurality of high frequency processing units 30 receiving a plurality of broadcasting waves of different frequency bands or broadcasting schemes share one local oscillator (the PLL unit 320), but is not limited to this case. A plurality of local oscillators may be installed to correspond to the respective high frequency processing units 30, and in this case, it becomes possible to keep the power consumption of the receiving apparatus 1 low by supplying power to only a local oscillator supplying a local oscillation signal to a high frequency processing unit that is receiving a broadcasting signal.

Also, the second embodiment described above is exemplified with a configuration in which one local oscillator can cover an entire reception frequency band, but is not limited to this configuration. For example, a configuration in which a plurality of local oscillators are installed to correspond to respective bands configuring the reception frequency band may be applied.

Additionally, the present disclosure may also be configured as below.

(1) A receiving apparatus including:
a first high frequency processing unit that detects a first broadcasting wave transmitted using a first frequency band, and extracts a first high frequency signal;
a second high frequency processing unit that detects a second broadcasting wave transmitted using a second frequency band different from the first frequency band, and extracts a second high frequency signal; and
at least one local oscillator that generates a local oscillation signal used in the first high frequency processing unit and the second high frequency processing unit.

(2) The receiving apparatus according to (1),
wherein the at least one local oscillator is configured with a fractional-N PLL circuit.

(3) The receiving apparatus according to (1) or (2), including:
a first switch unit that switches between the first high frequency processing unit and the second high frequency processing unit; and
a control unit that switches a connection point of the first switch unit to a high frequency processing unit receiving a broadcasting wave,
wherein the at least one local oscillator supplies the local oscillation signal to the high frequency processing unit selected by the first switch unit between the first high frequency processing unit and the second high frequency processing unit.

(4) The receiving apparatus according to (3),
wherein the control unit sets a high frequency processing unit not selected by the first switch unit to a power-off mode.

(5) The receiving apparatus according to (4), including:
a first output amplifier that amplifies the local oscillation signal generated by the local oscillator and outputs the amplified local oscillation signal to the first high frequency processing unit; and
a second output amplifier that amplifies the local oscillation signal and outputs the amplified local oscillation signal to the second high frequency processing unit,
wherein, when the power-off mode is set, the control unit performs control of interrupting supply of electric current to processing units other than the first output amplifier or the second output amplifier among respective processing units of the high frequency processing unit set to the power-off mode between the first high frequency processing unit and the second high frequency processing unit.

(6) The receiving apparatus according to (4) or (5),
wherein the control unit applies a fixed predetermined constant bias voltage to the first output amplifier and the second output amplifier, and
wherein, when the power-off mode is set, the control unit causes the bias voltage to an output amplifier set to the power-off mode between the first output amplifier and the second output amplifier to be output as an output voltage from the output amplifier.

(7) The receiving apparatus according to any one of (4) to (6), including:
a first output buffer amplifier that amplifies the local oscillation signal output from the frequency divider, and outputs the amplified local oscillation signal to the first high frequency processing unit;
a second output buffer amplifier that amplifies the local oscillation signal output from the frequency divider, and outputs the amplified local oscillation signal to the second high frequency processing unit; and
a second switch unit that selects one of the first output buffer amplifier and the second output buffer amplifier, and connects the selected output buffer amplifier to a circuit of a following stage,
wherein, when the power-off mode is set, the control unit performs control of switching a connection point of the second switch unit to an output buffer amplifier connected to the high frequency processing unit receiving the broadcasting wave, and setting an impedance of an output buffer amplifier connected to the high frequency processing unit set to the power-off mode to a predetermined high value.

(8) The receiving apparatus according to (1) or (2),
wherein at least one of the first frequency band and the second frequency band is a frequency band of satellite broadcasting.

(9) The receiving apparatus according to (1) or (2),
wherein at least one high frequency processing unit of the first high frequency processing unit and the second high frequency processing unit performs wave detection according to a direct conversion scheme, and
wherein the high frequency processing unit performing wave detection according to the direct conversion scheme includes
respective low noise amplifiers that correspond to the first high frequency signal and the second high frequency signal, and amplify any high frequency signal between the first high frequency signal and the second high frequency signal,
a first mixer that extracts a baseband signal of I phase by mixing the first high frequency signal or the second high frequency signal amplified by the respective low noise amplifiers and the local signal,
a second mixer that extracts a baseband signal of Q phase by mixing the first high frequency signal or the second high frequency signal amplified by the low noise amplifiers and a signal obtained by shifting a phase of the local signal by 90°,
a first filter that limits a frequency of the baseband signal of I phase to a predetermined band.
a second filter that limits a frequency of the baseband signal of Q phase to a predetermined band,
a demodulator that demodulates the baseband signal of I phase whose frequency has been limited to the predetermined band by the first filter and the baseband signal of Q phase whose frequency has been limited to the predetermined band by the second filter, and
a control unit that sets an oscillation frequency of the local oscillator, a frequency division ratio of a frequency divider in the local oscillator, cut-off frequencies of the first filter and the second filter, and a demodulation scheme of the demodulator based on channel selection information set by a user.

(10) The receiving apparatus according to (9),
wherein the first filter and the second filter are configured as a variable low pass filter capable of being set to a given cut-off frequency, wherein a lowest setting value of the cut-off frequency is determined according to a size of an occupied bandwidth of a carrier wave of a broadcasting wave having a lower frequency band between the first broadcasting wave and the second broadcasting wave, and wherein a highest setting value of the cut-off frequency is determined according to the size of the occupied bandwidth of the carrier wave of the broadcasting wave having the lower frequency band between the first broadcasting wave and the second broadcasting wave.

(11) The receiving apparatus according to (9) or (10), wherein the local oscillator includes a crystal oscillator, the frequency divider, a phase comparator, a loop filter, and a voltage controlled oscillator, and wherein a lowest setting value of the frequency division ratio of the frequency divider is determined according to a highest frequency value of a frequency band of a broadcasting wave having a higher frequency band between the first broadcasting wave and the second broadcasting wave.

(12) The receiving apparatus according to (11), wherein the voltage controlled oscillator of the local oscillator has an LC resonant circuit, and wherein a coil used in the LC resonant circuit is built in an integrated circuit.

(13) The receiving apparatus according to any one of (9) to (11), further including:

a first switch that switches an output point of the baseband signal of I phase between a first demodulator side and a second demodulator side; and a second switch that switches an output point of the baseband signal of Q phase between a first demodulator side and a second demodulator side, wherein the demodulator includes the first demodulator that performs demodulation according to a modulation scheme used in a first broadcast, and the second demodulator that performs demodulation according to a modulation scheme used in a second broadcast, and wherein the control unit switches connection points of the first switch and the second switch based on channel selection information set by the user.

(14) A receiving method including:

detecting, by a first high frequency processing unit, a first broadcasting wave transmitted using a first frequency band, and extracting a first high frequency signal;

detecting, by a second high frequency processing unit, a second broadcasting wave transmitted using a second frequency band different from the first frequency band, and extracting a second high frequency signal; and generating, by at least one local oscillator, a local oscillation signal used in the first high frequency processing unit and the second high frequency processing unit.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

REFERENCE SIGNS LIST 1, 5, 6 receiving apparatus
10 parabola antenna
20 UHF antenna
30 high frequency processing unit
40 demodulator
40s ISDB-S demodulator
40t ISDB-t demodulator
50 channel selection unit
60 storage unit
70 host CPU
100 receiving apparatus
101 parabola antenna
102 UHF antenna
110, 120 tuner
130 demodulator
200 first switch unit
301, 302 AGC amplifier
303 switch
304, 305 I/Q mixer
306 phase shifter
307, 308 variable LPF
309, 310 baseband amplifier
311 to 313 switch
320 PLL unit
321 crystal oscillator
322 frequency divider
322n N counter
322r R counter
323 phase comparator
324 loop filter
325 VCO
500 high frequency processing unit
501 AGC amplifier
502, 503 I/Q mixer
504 phase shifter
505, 506 variable LPF
507 baseband amplifier
510 PLL unit
511 VCO
512 frequency divider
520 ISDB-S demodulator
600 high frequency processing unit
601 AGC amplifier
602 mixer
603 switch
604 BPF
605 IF amplifier
610 local oscillator
611 to 613 VCO
620 ISDB-T demodulator
701, 702 output buffer amplifier
800 second switch unit
801, 802 switch
901 to 906 frequency divider
3201, 3202, 3203 PLL unit
B1 to B3 detection block
Bw1, Bw2 bandwidth
La1, La10, La2, La20 control line
Li1, Li10, Li2, Li20, Lo1, Lo2 signal line

The invention claimed is:

1. A receiving apparatus comprising:
a first high frequency processing unit that detects a first broadcasting wave transmitted using a first frequency band, and extracts a first high frequency signal;
a second high frequency processing unit that detects a second broadcasting wave transmitted using a second frequency band different from the first frequency band, and extracts a second high frequency signal;
at least one local oscillator that generates a local oscillation signal used in the first high frequency processing unit and the second high frequency processing unit; and a first switch unit that switches between the first high frequency processing unit and the second high frequency processing unit, wherein one of the first high frequency processing unit and the second high frequency processing unit is set to a power-off mode based on the switching.

2. The receiving apparatus according to claim 1, wherein the at least one local oscillator is configured with a fractional-N PLL circuit.

3. The receiving apparatus according to claim 2, comprising:
a control unit that switches a connection point of the first switch unit to a high frequency processing unit receiving a broadcasting wave,
wherein the at least one local oscillator supplies the local oscillation signal to the high frequency processing unit selected by the first switch unit between the first high frequency processing unit and the second high frequency processing unit.

4. The receiving apparatus according to claim 3, wherein the control unit sets one of the first high frequency processing unit and the second high frequency processing unit, not selected by the first switch unit to the power-off mode.

5. The receiving apparatus according to claim 4, comprising:
a first output amplifier that amplifies the local oscillation signal generated by the local oscillator and outputs the amplified local oscillation signal to the first high frequency processing unit; and
a second output amplifier that amplifies the local oscillation signal and outputs the amplified local oscillation signal to the second high frequency processing unit,
wherein, when the power-off mode is set, the control unit performs control of interrupting supply of electric current to processing units other than the first output amplifier or the second output amplifier among respective processing units of the high frequency processing unit set to the power-off mode between the first high frequency processing unit and the second high frequency processing unit.

6. The receiving apparatus according to claim 5, wherein the control unit applies a fixed predetermined constant bias voltage to the first output amplifier and the second output amplifier, and
wherein, when the power-off mode is set, the control unit causes the bias voltage to an output amplifier set to the power-off mode between the first output amplifier and the second output amplifier to be output as an output voltage from the output amplifier.

7. The receiving apparatus according to claim 6, comprising:
a first output buffer amplifier that amplifies the local oscillation signal output from a frequency divider in the local oscillator, and outputs the amplified local oscillation signal to the first high frequency processing unit;
a second output buffer amplifier that amplifies the local oscillation signal output from the frequency divider, and outputs the amplified local oscillation signal to the second high frequency processing unit; and
a second switch unit that selects one of the first output buffer amplifier and the second output buffer amplifier, and connects the selected output buffer amplifier to a circuit of a following stage,
wherein, when the power-off mode is set, the control unit performs control of switching a connection point of the second switch unit to an output buffer amplifier connected to the high frequency processing unit receiving the broadcasting wave, and setting an impedance of an output buffer amplifier connected to the high frequency processing unit set to the power-off mode to a predetermined high value.

8. The receiving apparatus according to claim 2, wherein at least one of the first frequency band and the second frequency band is a frequency band of satellite broadcasting.

9. The receiving apparatus according to claim 2, wherein at least one high frequency processing unit of the first high frequency processing unit and the second high frequency processing unit performs wave detection according to a direct conversion scheme, and
wherein the high frequency processing unit performing wave detection according to the direct conversion scheme includes
respective low noise amplifiers that correspond to the first high frequency signal and the second high frequency signal, and amplify any high frequency signal between the first high frequency signal and the second high frequency signal,
a first mixer that extracts a baseband signal of I phase by mixing the first high frequency signal or the second high frequency signal amplified by the respective low noise amplifiers and a local signal,
a second mixer that extracts a baseband signal of Q phase by mixing the first high frequency signal or the second high frequency signal amplified by the low noise amplifiers and a signal obtained by shifting a phase of the local signal by 90°,
a first filter that limits a frequency of the baseband signal of I phase to a predetermined band,
a second filter that limits a frequency of the baseband signal of Q phase to a predetermined band,
a demodulator that demodulates the baseband signal of I phase whose frequency has been limited to the predetermined band by the first filter and the baseband signal of Q phase whose frequency has been limited to the predetermined band by the second filter, and
a control unit that sets an oscillation frequency of the local oscillator, a frequency division ratio of a frequency divider in the local oscillator, cut-off frequencies of the first filter and the second filter, and a demodulation scheme of the demodulator based on channel selection information set by a user.

10. The receiving apparatus according to claim 9, wherein the first filter and the second filter are configured as a variable low pass filter capable of being set to a given cut-off frequency,
wherein a lowest setting value of the cut-off frequency is determined according to a size of an occupied bandwidth of a carrier wave of a broadcasting wave having a lower frequency band between the first broadcasting wave and the second broadcasting wave, and
wherein a highest setting value of the cut-off frequency is determined according to the size of the occupied bandwidth of the carrier wave of the broadcasting wave having the lower frequency band between the first broadcasting wave and the second broadcasting wave.

11. The receiving apparatus according to claim 10, wherein the local oscillator includes a crystal oscillator, the frequency divider, a phase comparator, a loop filter, and a voltage controlled oscillator, and
wherein a lowest setting value of the frequency division ratio of the frequency divider is determined according to a highest frequency value of a frequency band of a broadcasting wave having a higher frequency band between the first broadcasting wave and the second broadcasting wave.

12. The receiving apparatus according to claim 11,
wherein the voltage controlled oscillator of the local oscillator has an LC resonant circuit, and
wherein a coil used in the LC resonant circuit is built in an integrated circuit.

13. The receiving apparatus according to claim 11, further comprising:
a first switch that switches an output point of the baseband signal of I phase between a first demodulator side and a second demodulator side; and
a second switch that switches an output point of the baseband signal of Q phase between a first demodulator side and a second demodulator side,
wherein the demodulator includes the first demodulator that performs demodulation according to a modulation scheme used in a first broadcast, and the second demodulator that performs demodulation according to a modulation scheme used in a second broadcast, and
wherein the control unit switches connection points of the first switch and the second switch based on channel selection information set by the user.

14. A receiving method comprising:
detecting, by a first high frequency processing unit, a first broadcasting wave transmitted using a first frequency band, and extracting a first high frequency signal;
detecting, by a second high frequency processing unit, a second broadcasting wave transmitted using a second frequency band different from the first frequency band, and extracting a second high frequency signal;
generating, by at least one local oscillator, a local oscillation signal used in the first high frequency processing unit and the second high frequency processing unit; and
switching, by a switch unit, between the first high frequency processing unit and the second high frequency processing unit, wherein one of the first high frequency processing unit and the second high frequency processing unit is set to a power-off mode based on the switching.

15. A receiving apparatus comprising:
a first high frequency processing unit that detects a first broadcasting wave transmitted using a first frequency band, and extracts a first high frequency signal;
a second high frequency processing unit that detects a second broadcasting wave transmitted using a second frequency band different from the first frequency band, and extracts a second high frequency signal, wherein at least one of the first frequency band and the second frequency band is a frequency band of satellite broadcasting;
at least one local oscillator that generates a local oscillation signal used in the first high frequency processing unit and the second high frequency processing unit, wherein the at least one local oscillator is configured with a fractional-N PLL circuit; and
a first switch unit that switches between the first high frequency processing unit and the second high frequency processing unit based on channel selection information, and wherein the channel selection information is generated based on one of a program selected through an electronic program guide (EPG) or a program selected for recording reservation.

* * * * *